US012786207B2

(12) United States Patent
Horan et al.

(10) Patent No.: US 12,786,207 B2
(45) Date of Patent: Nov. 3, 2026

(54) SELF-CONTAINED ROBOTIC UNITS FOR PROVIDING MOBILE NETWORK SERVICES AND INTELLIGENT PERIMETER

(71) Applicant: Fenix Group, Inc., Chantilly, VA (US)

(72) Inventors: Savanna Horan, Chantilly, VA (US); Taylor Thompson, Chantilly, VA (US); David Peterson, Haymarket, VA (US); Rashmi Rogers, Chantilly, VA (US)

(73) Assignee: Fenix Group, Inc., Chantilly, VA (US)

( * ) Notice: Subject to any disclaimer, the term of this patent is extended or adjusted under 35 U.S.C. 154(b) by 247 days.

(21) Appl. No.: 18/535,264

(22) Filed: Dec. 11, 2023

(65) Prior Publication Data

US 2024/0179161 A1 May 30, 2024

Related U.S. Application Data

(63) Continuation of application No. 17/099,092, filed on Nov. 16, 2020, now Pat. No. 11,882,129.

(60) Provisional application No. 63/052,204, filed on Jul. 15, 2020.

(51) Int. Cl.

| | |
|---|---|
| ***H04L 9/40*** | (2022.01) |
| ***G06N 20/00*** | (2019.01) |
| ***H04W 16/18*** | (2009.01) |
| *H04W 84/00* | (2009.01) |

(52) U.S. Cl.

CPC ......... *H04L 63/1416* (2013.01); *G06N 20/00* (2019.01); *H04W 16/18* (2013.01); *H04W 84/005* (2013.01)

(58) Field of Classification Search

CPC .... H04L 63/1416; G06N 20/00; G06N 3/044; G06N 3/045; G06N 3/08; H04W 16/18; H04W 84/005; H04W 12/121

See application file for complete search history.

(56) References Cited

U.S. PATENT DOCUMENTS

| | | | |
|---|---|---|---|
| 7,133,800 | B2 | 11/2006 | Delin et al. |
| 8,594,844 | B1 | 11/2013 | Gal |
| 8,879,426 | B1 | 11/2014 | Quilling et al. |

(Continued)

*Primary Examiner* — Frantz Bataille
(74) *Attorney, Agent, or Firm* — Polsinelli PC

(57) ABSTRACT

Disclosed are systems and methods for a robotic mobile perimeter and telecommunication network. One or more stationary ground units are associated with a perimeter protected entity and comprise a broadband cellular network core for providing a private telecommunication network, and secondary transceivers for providing a second telecommunication network. Mobile robotic units comprise a broadband cellular network node for extending the private telecommunication network, secondary transceivers, a plurality of sensors, a locomotion device, and a controller. The mobile robotic units simultaneously create a dynamically responsive perimeter around the perimeter protected entity and a movable extension of the private telecommunication network, wherein the controllers generate locomotion control signals to cause least a portion of the plurality of mobile robotic units to reposition themselves within the surrounding environment and provide continuous coverage from the private telecommunication network to the perimeter protected entity as one or more locations of the perimeter protected entity change.

19 Claims, 7 Drawing Sheets

(56) References Cited

U.S. PATENT DOCUMENTS 9,686,238 B1 6/2017 Row, II
11,403,833 B2 8/2022 Fukutome et al.
2002/0025779 A1 2/2002 Knight et al.
2003/0235174 A1* 12/2003 Pichna .................. H04L 63/104 370/392
2004/0140404 A1 7/2004 Ohta et al.
2004/0203777 A1 10/2004 Watanabe et al.
2004/0266439 A1 12/2004 Lynch, Jr. et al.
2006/0166687 A1 7/2006 Edman
2007/0032220 A1 2/2007 Feher
2007/0200027 A1 8/2007 Johnson
2008/0009970 A1* 1/2008 Bruemmer ........... G05D 1/0088 700/245
2008/0151908 A1 6/2008 Yeh et al.
2009/0138123 A1 5/2009 Pellegrino et al.
2010/0020753 A1 1/2010 Fulknier et al.
2010/0279647 A1 11/2010 Jacobs et al.
2011/0292823 A1 12/2011 Barbieri et al.
2012/0185115 A1 7/2012 Dean
2012/0289226 A1 11/2012 Burgess
2013/0123980 A1 5/2013 Seo
2014/0323137 A1 10/2014 Graffagnino et al.
2015/0054671 A1 2/2015 Mohamadi
2015/0078167 A1 3/2015 Papa et al.
2015/0367513 A1 12/2015 Gettings et al.
2016/0018224 A1* 1/2016 Isler ..................... G06Q 10/047 701/25
2017/0019799 A1 1/2017 Djordjevic et al.
2017/0210376 A1 7/2017 Jain et al.
2017/0225336 A1 8/2017 Deyle et al.
2017/0315552 A1 11/2017 Matsuyama et al.
2018/0007518 A1 1/2018 O'Berry et al.
2018/0014234 A1 1/2018 Graffagnino et al.
2018/0014340 A1 1/2018 Hill et al.
2018/0024556 A1* 1/2018 Meeker ..................... B60F 5/02 701/2
2018/0059660 A1 3/2018 Heatzig et al.
2018/0104816 A1 4/2018 Tokuchi
2018/0151045 A1 5/2018 Kim et al.
2018/0205770 A1 7/2018 Joo et al.
2018/0240322 A1 8/2018 Potucek et al.
2018/0253980 A1 9/2018 Mohamadi
2019/0041216 A1 2/2019 Chin et al.
2019/0064817 A1 2/2019 Schmitt et al.
2019/0079532 A1 3/2019 Crawley
2019/0147715 A1 5/2019 Noras
2019/0191303 A1 6/2019 Ofir et al.
2019/0246626 A1 8/2019 Baughman et al.
2019/0269290 A1 9/2019 Morita et al.
2019/0297438 A1 9/2019 Miyawaki
2019/0311604 A1 10/2019 Morehouse et al.
2020/0108923 A1 4/2020 Smith et al.
2020/0117900 A1 4/2020 Deng et al.
2020/0285249 A1 9/2020 Woods et al.
2021/0001480 A1 1/2021 Artes et al.
2021/0279986 A1 9/2021 Igein

* cited by examiner

SELF-CONTAINED ROBOTIC UNITS FOR PROVIDING MOBILE NETWORK SERVICES AND INTELLIGENT PERIMETER

CROSS-REFERENCE TO RELATED APPLICATIONS

This application is a continuation of U.S. Non-Provisional application Ser. No. 17/099,092, filed Nov. 16, 2020, which claims priority to U.S. Provisional Patent Application No. 63/052,204, filed Jul. 15, 2020, which are hereby incorporated by reference, in their entirety and for all purposes.

TECHNICAL FIELD

The present disclosure pertains to the incorporation of multiple communication modes and network services in a single self-contained unit, and more particularly pertains to a multi-domain robotic unit for providing an autonomous perimeter and an integrated private communication network over various communication modalities.

BACKGROUND

In an increasingly digital and interconnected age, reliable communications have become a cornerstone upon which many aspects of modern life are built. Although typically considered in the context of everyday usage scenarios, such as at the office or the home, reliable communications are also of tremendous importance in governmental and military contexts, in which failed or unreliable communications are not just a mere inconvenience but can put multiple lives at risk. Somewhat closer to home, reliable communications have proven to be essential in providing emergency services and emergency response—yet to this day, large numbers of natural disasters, humanitarian crises, and other emergency events continue to suffer from a lack of reliable communications. Regardless of the context, in the absence of the ability to communicate and send data, the flow of information grinds to a halt, crippling decision-making and logistical operations during times of crisis or need.

In the context of communications systems that are designed for military or emergency use, or are otherwise designed to be robust against failure, a primary focus is communication availability and reliability at the network edge. Another important design factor is communications redundancy. For example, military personnel operate various forms of different communications equipment in an attempt to ensure that audio and/or data connectivity are maintained in the event of a communications failure at the tactical edge. In light of these two factors (network robustness/edge reliability and communications redundancy), communication systems can be designed to flexibly adapt to changing conditions in the deployment environment of the network. However, such systems are merely reactive to detected changes or failures in the network or network environment (e.g., detecting a weakening signal over a first communication band and then switching to a second communication band). In many emergency and/or military scenarios in which communication reliability can be of the utmost importance, these network changes or failures can come about rapidly, caused for example by changes in weather or by active countermeasures taken by adversaries. Accordingly, it would be desirable to not only provide a self-contained mobile communication network, but also to equip the self-contained mobile communication network with active measures to proactively detect and identify threats to the network or communication capabilities before or as they manifest themselves.

SUMMARY

Disclosed herein are systems and methods for a multi-domain autonomous robotic perimeter, wherein one or more self-contained and self-sufficient robotic units provide an integrated private communication network over multiple communication modalities, actively identify and/or respond to detected threats at the perimeter, and dynamically optimize the integrated private communication network in response to threats and changing environmental conditions in order to achieve a superior degree of communication reliability and functionality. In some embodiments, the multi-domain autonomous robotic perimeter can provide a self-contained multi-modal communication system (see, for example, the multi-modal communication system disclosed in commonly owned U.S. patent application Ser. No. 17/092,548, the contents of which are hereby incorporated by reference in their entirety.

The autonomous robotic perimeter can include robotic units operating across multiple domains, e.g., air robotic units (mobile and/or stationary) and ground robotic units (mobile and/or stationary) operating in conjunction with one another. More generally, aspects of the present disclosure contemplate multiple independent heterogeneous robotic units working towards a shared goal. In some embodiments, one or more central control units (mobile and/or stationary) can operate in conjunction with the air robotic units and the ground robotic units, performing functions such as centralized control and command, offloading of heavy-duty processing tasks, providing databases, running one or more network cores, providing human-machine interface(s), providing communication relays and inter-network connections, etc., as will be described in greater depth below.

Advantageously, as mentioned previously, the multiple mobile robotic units can operate in a distributed and/or collaborative fashion, wherein the mobile robotic units run in a substantially independent fashion but work jointly or collaboratively towards a common goal (e.g., providing an intelligent mobile perimeter, providing an integrated private communications network, etc.). This distributed/collaborative design of the multi-domain autonomous robotic perimeter eliminates or mitigates the single point of failure dynamic that plagues many conventional mobile network solutions, including those used by emergency and military personnel.

In some embodiments, one or more of the self-contained robotic units comprising the multi-domain autonomous robotic perimeter (and/or the central control unit(s)) can include an edge (or edge cloud) compute stack, one or more mobile network cores, an ethernet switch, one or more private mobile telecommunications nodes (e.g., implementing a 2G, 3G, 4G, and/or 5G standard), and a Layer Two Integrated Mobile Ad-hoc Network ("MANET") radio. In some embodiments, one or more of the self-contained robotic units (and/or the central control unit(s)) can further comprise one or more communication nodes, radios and/or transceivers for implementing additional communications networks and modalities, including but not limited to satellite communications and Visible Light Communication ("VLC").

Other forms of wireless communication devices may be used in addition to or in replacement of the MANET radio, the private mobile telecommunication node, and/or the additional communication nodes. Such other forms of wireless communications devices may implement protocols including, but not limited to, IEEE 802.11, Bluetooth, serial wireless, etc.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Figure 1A:
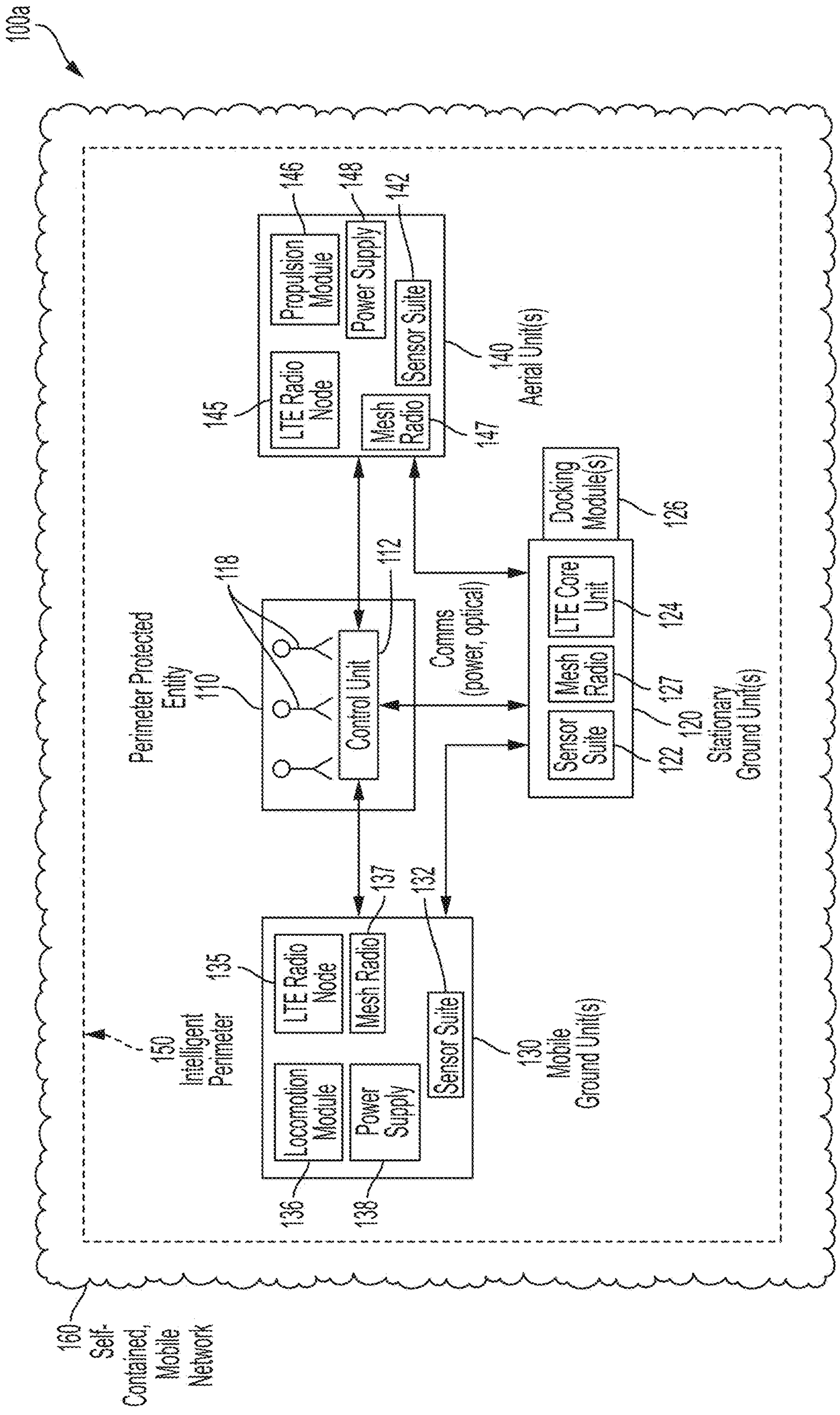
FIG. 1A depicts an example architecture diagram of a multi-domain autonomous robotic perimeter and integrated mobile communication network according to aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. It will be appreciated that for simplicity and clarity of illustration, where appropriate, reference numerals have been repeated among the different figures to indicate corresponding or analogous elements. The description is not to be considered as limiting the scope of the embodiments described herein. Aspects of the disclosure may be embodied in many different forms and should not be construed as limited to the example embodiments set forth herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein.

The disclosure turns now to FIG. 1A, which illustrates an example architecture diagram of a multi-domain mobile robotic network 100*a*. The mobile robotic network 100*a* comprises a plurality of different robotic units (shown here as stationary ground units 120, mobile ground units 130, and aerial units 140) that function to provide both an intelligent perimeter 150 and a self-contained mobile network 160 to a perimeter protected entity 110. Perimeter protected entity 110 includes one or more human users 118, which might be military personnel, emergency personnel, first responders, etc., although other humans, entities, and objects can form the perimeter protected entity. Regardless of its specific composition, the plurality of robotic units can be carried by or otherwise move with perimeter protected entity 110 in order to provide the perimeter protected entity with continuous coverage from both intelligent perimeter 150 and mobile network 160.

By operating in a collaborative fashion, the plurality of robotic units of mobile robotic network 100*a* can mitigate single point of failure risks and assist perimeter protected entity 110 in a much more robust fashion. Notably, the robotic units can be dynamically adjusted and/or reconfigured in order to bring about corresponding changes in intelligent perimeter 150, mobile network 160, or both. For example, these dynamic (and in some embodiments, autonomous) adjustments can be made as perimeter protected entity 110 moves, as the physical environment changes, as the communication environment changes, as constituent components/sub-components of the mobile robotic network 100*a* become available or unavailable, as mission parameters change, etc.

Below is a brief overview of the constituent components of the mobile robotic network 100*a* illustrated in FIG. 1A. Following the overview is a more detailed discussion of each type of robotic unit and its functionalities—FIG. 1A depicts examples of the three primary unit types utilized in mobile robotic network 100*a*: stationary ground units 120, mobile ground units 130, and aerial units 140. Groups of these units, e.g., one of each type, are assembled to form the building blocks of the network architecture underlying the present disclosure.

Figure 1B:
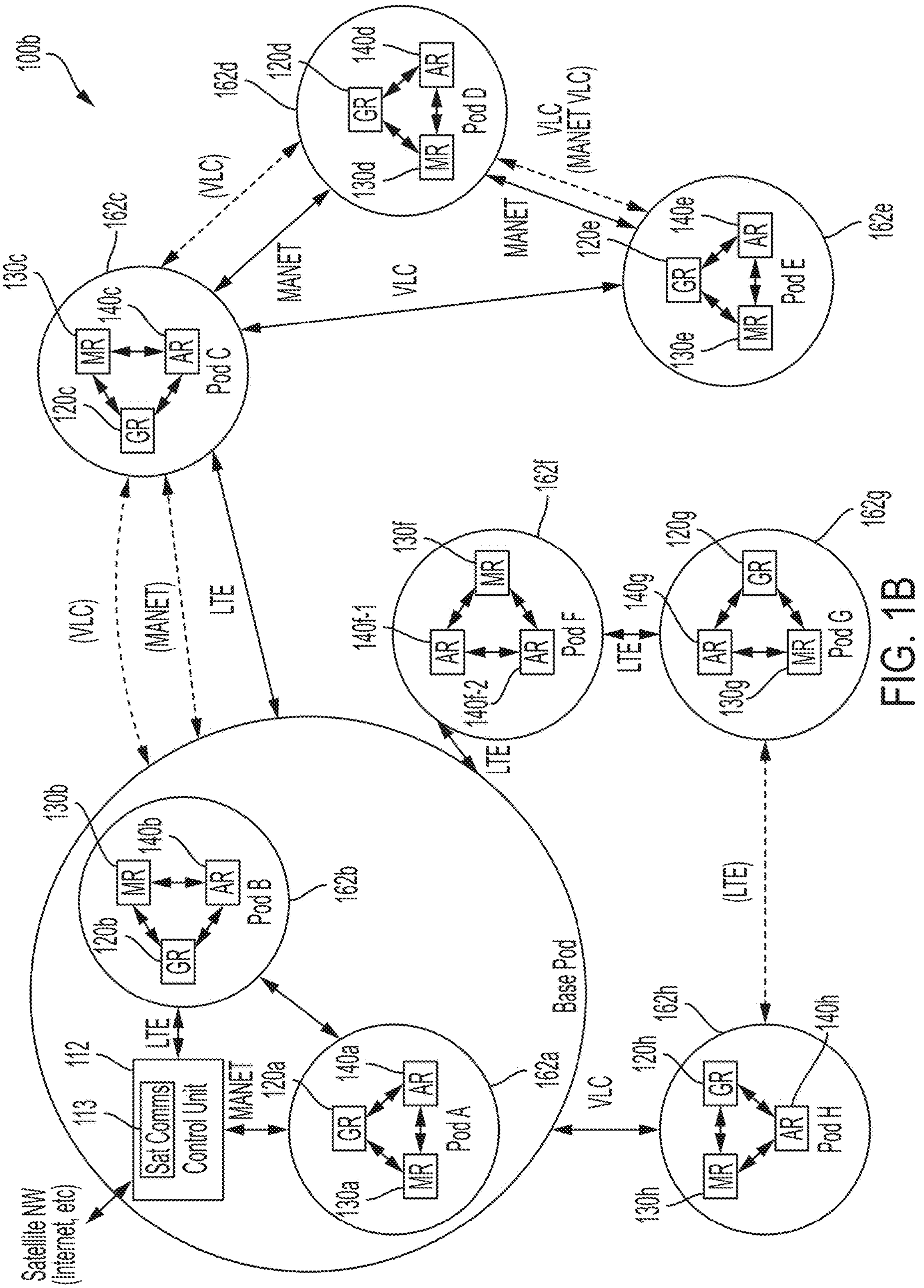
FIG. 1B depicts an example communications diagram between constituent communication pods of a multi-domain autonomous robotic perimeter and integrated mobile communication network according to aspects of the present disclosure.

Following the discussion of the different robotic unit types, the disclosure turns to FIG. 1B, which illustrates an example deployment of the presently disclosed mobile robotic network and makes use of this building-block level abstraction of the three different unit types into groups in order to illustrate more complicated scenarios and use cases. Again, in FIG. 1B the individual robotic units are depicted from a broader fashion than in FIG. 1A in order to more clearly explain aspects of the interactions and communications between multiple different robotic units and "building block" groupings of units as they work collaboratively to implement intelligent perimeter 150 and mobile network 160.

Mobile Robotic Network—Overview

Mobile robotic network 100*a* can comprise a plurality of robotic units, which can be of same or different types. As shown in FIG. 1A, the robotic units include stationary ground units 120, mobile ground units 130, and aerial units 140, although it is appreciated that other combinations or groupings of distinct robotic unit types are possible without departing from the scope of the present disclosure. Moreover, it is contemplated that the individual robotic units within one of the aforementioned unit types can be heterogeneous or homogeneous; in other words, for example, all of the aerial units 140 might be substantially identical in their design, or there might be multiple different types of aerial units 140, etc. As mentioned previously, the plurality of individual robotic units, whether of a heterogeneous or homogeneous mix, work collaboratively to implement intelligent perimeter 150 and provide private mobile network 160 for the perimeter protected entity 110.

The perimeter protected entity 110 is shown here as comprising one or more human users 118 and a control unit 112. In some embodiments, the one or more human users 118 can include military personnel, emergency personnel, first responders, etc., although it is appreciated that the constituent members of perimeter protected entity 110 are not limited to only these such individuals. For example, perimeter protected entity 110 could include inanimate objects associated with human users 118 and/or objects selected to be provided with the monitoring, communication, and/or intelligent perimeter functionalities of mobile robotic network 100*a*. Generally, perimeter protected entity 110 can be broadly understood as the group of entities and/or objects that make use of or are contained within) at least a portion of intelligent perimeter 150 and self-contained mobile network 160. A control unit 112 can optionally be present (as illustrated here) to provide a human-usable interface and various monitoring, control, and processing functionalities with respect to constituent components and sub-components of the mobile robotic network 100*a*, as will be explained in greater depth below. In some embodiments, control unit 112 can be provided as a mobile computing device or tablet, with a display interface allowing a user to monitor sensor data, view detected threats or other observations along the intelligent perimeter, and interact with one or more of the robotic units, e.g., by changing a configuration or parameter, or by sending a command.

Intelligent perimeter 150 can comprise a boundary or enclosed area that is monitored or sensed in some fashion by one or more of the constituent robotic units of mobile robotic network 100*a*. Intelligent perimeter 150 can be a conceptual boundary, or can be a physically delimited boundary that is patrolled by one or more of the constituent robotic units of mobile robotic network 100*a*. For example, as shown in FIG. 1A, intelligent perimeter 150 is rectangular in shape and sufficiently sized to fully encapsulate perimeter protected entity 110 plus a portion of the environment surrounding the perimeter protected entity. It is appreciated, however, that intelligent perimeter 150 can take various different sizes and shapes as needed and/or as configured, and furthermore can adjust dynamically and/or autonomously based on one or more sensed conditions or other adjustments determined to be needed by mobile robotic network 100*a* or one of its constituent robotic units. Note, moreover, that intelligent perimeter 150 is shown in FIG. 1A in two-dimensions for simplicity of illustration and explanation—however, it is possible for intelligent perimeter 150 to be defined in three-dimensional space, particularly with the use of one or more aerial units 140 that can add a vertical element to the two-dimensional intelligent perimeter 150 that is depicted in FIG. 1A.

The robotic units (e.g., some combination of stationary ground units 120, mobile ground units 130, and aerial units 140) can be configured to work collaboratively to establish intelligent perimeter 150, e.g., by ingesting sensor and environmental monitoring data from individual robotic units located at fixed or moving/patrolling observation points. In some embodiments, the robotic units can be provided with an array of sensors or a sensor suite, including one or more of LIDAR, depth/stereo cameras and sensors, electro-optical sensors, infrared sensors, UV sensors, GPS and/or location/position sensors, inertial measurement units, microphones and/or sound sensors, temperature sensors, spectrometers, spectroradiometers, gas chromatography sensors, Geiger counters, biochemical sensors (bio-sniffers), etc. Different robotic units can be provided with different sensor suites depending on mission parameters or other desired configuration factors. In some embodiments, the specific sensors equipped within a given robotic unit's sensor suite can be changed in the field, i.e., while the mobile robotic network 100*a* is deployed around perimeter protected entity 110, or the sensor(s) can otherwise be provided in a modular and upgradable/swappable fashion.

The sensed data can be analyzed to identify threats, perimeter disruptions, and other such anomalous or noteworthy events at or within perimeter 150. This analysis can be performed onboard the discrete robotic units (either at the robotic unit making the sensor measurement and/or distributed amongst a network of one or more different robotic units) or can be processed at a central location. For example, a central processing location could be provided at perimeter protected entity 110 in combination with control unit 112, by one or more of the stationary ground units 120, by an external or cloud-compute facility, or some combination of the above. In some embodiments, one or more machine-learning networks can be employed within or by mobile robotic network 100*a* in order to refine the threat detection based on sensed data ingested by the plurality of robotic units at intelligent perimeter 150, e.g., wherein the sensed data is utilized to generate further training data for updating and retraining threat-detection and other machine learning networks present within mobile robotic network 100*a*.

In addition to maintaining intelligent perimeter 150, the plurality of robotic units (e.g., stationary ground units 120, mobile ground units 130 and aerial units 140) also simultaneously provide a private and secure mobile communication network 160. Because it is self-contained, mobile network 160 is not reliant on any external networks or communications hardware besides that which is contained within the robotic units of mobile robotic network 100*a* (although it is of course possible for the self-contained mobile network 160 to communicate or be linked with one or more such external networks). Mobile network 160 can be implemented over multiple different communication modalities, protocols, or mediums. For example, self-contained mobile network 160 can implement one or more of: 2G, 3G, 4G, or 5G cellular; a Mobile Ad-hoc Network (MANET); Visible Light Communication (VLC); satellite communications; direct data links (DDL); Bluetooth; WiFi; serial wireless, etc. See, for example, commonly owned U.S. patent application Ser. No. 17/092,548, the contents of which are incorporated by reference in their entirety. The supporting hardware for implementing and providing private mobile communication network 160 can be integrated with one or more of the robotic units. For instance, stationary ground units 120 are shown as including an LTE core unit 124 while mobile ground units 130 and aerial units 140 are shown as including LTE radio nodes 135,145, respectively (i.e., corresponding to a specific example in which private mobile communication network 160 implements an LTE communication protocol). Equipment for backup or additional communication modalities can also be integrated with one or more of the robotic units, e.g., in the form of mesh radios 127, 137, and 147.

Robotic Units—Stationary Ground Units 120

As illustrated in FIG. 1A, stationary ground unit(s) 120 include a sensor suite 122, a communications core unit 124 (shown here as LTE core unit 124), a mesh radio 127, and docking module(s) 126. Note that although the following discussion makes reference to LTE communications and LTE-specific components, this is for purposes of example and is not to be construed as limiting—other mobile communications protocols such as 2G, 3G, and 5G can be employed with the requisite hardware included on the robotic unit, without departing from the scope of the present disclosure.

It is contemplated that stationary ground units 120 can participate in providing intelligent perimeter 150 and/or mobile network 160 without having to move from a location in which they are initially deployed. From this deployment location, stationary ground units 120 can assume a bulk of the base-level, power intensive and/or computationally demanding operations required in providing the intelligent perimeter and mobile network—such as housing the mobile network core(s) and analyzing/processing sensor data streamed from mobile robots at intelligent perimeter 150—as the stationary ground units 120 are better equipped to perform these intensive tasks in comparison to mobile ground units 130 and aerial units 140, both of which expend a significant amount of their power, internal volume, processing capacity, etc., in supporting their movement along the intelligent perimeter or within the surrounding environment. By contrast, stationary ground units 120 can house a much larger power supply or even be connected to an external power source (e.g., generators set up by the human users within perimeter protected entity 110; mains electricity when the perimeter protected entity has a connection to a power grid). By virtue of this increased power availability, stationary ground unit 120 more easily accommodates power-intensive tasks. Similarly, stationary ground unit 120 can house more robust computing devices in comparison to mobile ground units 130 and aerial units 140, due to its increased power availability and/or additional capacity to house larger computing devices in the absence of having to house a propulsion or locomotion mechanism.

Accordingly, stationary ground unit 120 can in general be configured to perform those tasks which are not location or movement specific, either by design or in response to a request from a mobile ground unit 130 or aerial unit 140 to offload such a task. Mobile ground units 130 and aerial units 140 can then be correspondingly configured to perform primarily those tasks which are location or movement specific, including movement-specific task requests that are received from stationary ground unit 120, a user within perimeter protected entity 110, and/or from control unit 112. Additionally, stationary ground unit 120 can be configured with sensors and/or other payload components that offer better performance (e.g., a higher resolution camera/spectrometer, a higher resolution thermal scanner, etc.) or have a higher power consumption in comparison to the sensors and payload components of mobile ground units and aerial units.

For example, stationary ground unit 120 can house a telecommunications core unit, i.e., LTE core unit 124 in the example of FIG. 1A in which mobile network 160 is an LTE network, while mobile ground unit 130 and aerial unit 140 house only LTE radio nodes 135, 145 respectively. In some embodiments, the LTE radio nodes 135, 145 can assist the LTE core unit(s) 124 of stationary ground unit(s) 120 in providing the mobile network 160 and/or can function as additional LTE core units. In some embodiments, the LTE radio nodes 135, 145 can simply participate in the mobile network 160 as a piece of user equipment, i.e., in the same manner that a user's mobile computing device would connect to and participate in mobile network 160 (these and further details of the mobile ground units and aerial units will be discussed in greater depth below, in the corresponding sections).

Stationary ground unit 120 can also support the processing and coordination required to establish and maintain the intelligent perimeter 150 by all of the robotic units of mobile robotic network 100*a* as a whole. For example, stationary ground unit could support and/or augment a SLAM (simultaneous localization and mapping) process performed by the individual mobile ground units 130 and aerial units 140. When deployed, the mobile ground units 130 and aerial units 140 would use their sensor suits 132, 142 to ingest environmental data and build, update, or refine intelligent perimeter 150. As mentioned previously, these sensors can include, but are not limited to, one or more of LIDAR, depth/stereo cameras and sensors, electro-optical sensors, infrared sensors, GPS and/or location/position sensors, inertial measurement units, microphones and/or sound sensors, etc.

As the mobile robotic unit (mobile ground unit 130 or aerial unit 140) moves through its environment or traverses the intelligent perimeter 150, it can ingest sensor data and store it locally, initially building a map using an onboard processor. In some embodiments, the mobile robotic unit can transmit its built map to a stationary ground unit 120 after determining that it has achieved a coherent mapping. In some embodiments, the mobile robotic unit might store both its ingested sensor data and constructed map locally until the end of its mission/deployment (i.e., until it docks with a stationary ground unit 120 via docking module(s) 126 or otherwise enters a stored/non-deployed state), at which time the ingested sensor data and constructed map are offloaded in bulk to the stationary ground unit 120 (and/or to control unit 112 or a central server or processing location). It is also possible for the mobile robotic unit to stream ingested sensor data to stationary ground unit 120 for real-time processing and mapping/map construction, and then receive in response real-time updates as stationary ground unit 120 constructs a map from the ingested sensor data. In some embodiments, the mobile robotic unit can build a rudimentary map onboard, and then offload its ingested sensor data to stationary ground unit 120 for construction of a more sophisticated or detailed map, which is then stored and configured in memory of mobile robotic units that are deployed in the future.

Stationary ground unit 120 can also be utilized to compile the disparate maps from individual mobile robotic units (whether constructed by an onboard processor of the individual mobile robotic unit or constructed by the stationary ground unit 120 from ingested sensor data transmitted from the individual mobile robotic unit) into a single cohesive map of the intelligent perimeter 150/overall environment in which the mobile robotic units are operating and mapping. When a mobile robotic unit (mobile ground unit 130 or aerial unit 140) is activated for a next or subsequent deployment, it can be configured with the most-recent already built map, at which point the now deployed mobile robotic unit can re-locate itself using the configured map and then continue utilizing the configured map to perform its mission (e.g., patrol intelligent perimeter 150) or perform further mapping (e.g., of the same, already mapped area or of a new, adjacent area into which the mobile robotic network 100*a*/perimeter protected entity 110 are moving into). As will be discussed in greater depth in the sections below, aerial units 140 (due to limitations in size, battery power, and processing power) might perform minimal onboard processing and rely primarily upon transmitting ingested sensor data to stationary ground units 120 (or other central server(s)/computing device(s)) for processing and mapping. In some embodiments, this might manifest itself as aerial units 140 transmitting back its ingested sensor data at much shorter intervals than those at which mobile ground units 130 transmit back their ingested sensor data (as mobile ground units 130 can more easily accommodate onboard processing in comparison to aerial units 140, due to the increased payload of mobile ground units 130 enabling larger power supplies and greater computational power). In some embodiments, the division of processing labor between the onboard processors of the mobile ground units 130 and aerial units 140, and the computing device(s) of stationary ground units 120 (and/or other central server(s)/computing device(s)) can be dynamically adjusted and optimized in response to measured performance characteristics and other mission parameters, configurations and requirements. Likewise, the intervals at which the mobile ground units 130 and aerial units 140 transmit their ingested sensor data for processing and map construction can be dynamically adjusted based on observed prior performance and/or benchmarks.

By implementing a collaborative environmental sensing and associated mapping/SLAM (simultaneous localization and mapping) processing, stationary ground unit 120 assists in meshing the various sensors from the sensor suites 132, 142 of the mobile ground units 130 and aerial units 140, respectively. Notably, this process of layering and meshing not only achieves higher resolution and more accurate mapping than if performed by any of the robotic units independently, but can also assist in performing object identification by providing vastly more sensor data pertaining to any unidentified object or potential threat/object that needs to be assessed at or within intelligent perimeter 150. Once identified, objects and/or threats can also be added to the composite map maintained at stationary ground unit 120 (and/or at a central server/computing device associated with the perimeter protected entity 110).

Although not shown, stationary ground unit 120 includes a power supply module, which can be a battery or other energy storage mechanism and/or an electrical interface for receiving external power, as was mentioned previously. In some embodiments, stationary ground unit 120 can include both a battery and an electrical interface for receiving external power, in which case the battery can be charged from the external power source and utilized as a backup or additional power source, i.e., in case of any interruption to the external power source, which may be a common occurrence in remote or inhospitable environments in which the presently disclosed mobile robotic network 100*a* might be deployed or utilized. In the absence of an electrical interface, or in the absence of available/reliable external power sources, stationary ground unit 120 can utilize solely the battery to power itself and any connected components (e.g., a mobile ground unit 130 and/or aerial unit 140 coupled to the stationary ground unit via docking module(s) 126). When using battery power, a battery change will be necessary at some periodic interval and can be performed by a human user from perimeter protected entity 110 and/or by one of the mobile ground units 130 or aerial units 140. In some embodiments, stationary ground unit 120 can monitor its battery health and status and stream reports back to control unit 112 in order to prevent a situation in which stationary ground unit 120 runs out of power. For example, stationary ground unit 120 might transmit a low battery alert back to control unit 112 or perimeter protected entity 110 to signal that a battery swap is needed; or stationary ground unit 120 might automatically transmit a battery swap request to be fulfilled by one of the mobile ground units 130 or aerial units 140. In some embodiments, stationary ground unit 120 might be configured to receive one or more batteries or battery types that are normally used to power the mobile ground units 130 and/or aerial units 140, e.g., such that one or more of the mobile robots could ‘sacrifice’ their batteries in order to keep stationary ground unit 120 powered on and performing its primary role in maintaining intelligent perimeter 150 and mobile network 160.

Stationary ground unit 120’s power supply module (whether in the form of a battery or electrical interface) is coupled to docking module(s) 126, which allow the stationary ground unit 120 to electrically and/or communicatively couple to mobile ground units 130 and aerial units 140. For example, docking module 126 could be used to recharge the internal batteries of mobile ground units and aerial units when they are nearing depletion, in which case the mobile robot could maneuver itself to the location of the nearest (or otherwise appropriately selected) stationary ground unit 120 that is able to provide charging and has an available docking module 126. If stationary ground unit 120 is running off of battery power itself, then in some embodiments it can determine a current charge level of a mobile robot that is requesting charging and then negotiate a charge amount to distribute, wherein the need to maintain the uptime of the stationary ground unit 120 is optimized against the need to maintain or prolong the uptime of the mobile robot requesting a charge. Such an optimization could also account for a projected time at which stationary ground unit 120 would be able to recharge its battery or receive a battery swap, information which could be queried from control unit 112 and/or from the mobile robotic network 100*a* itself.

In addition to recharging mobile robotic units (i.e., mobile ground units 130 and aerial units 140), docking module 126 can also be utilized to house one or more mobile robotic units. Mobile robotic units might be housed temporarily, e.g., while charging, or could be housed on a more long-term basis, e.g., while being stored or awaiting a command to deploy. The mobile robotic units could be housed within an internal volume of stationary ground unit 120 such as a compartment or slot, the mobile robotic units could be housed externally. In some embodiments, any given one of the stationary ground units 120 could be designed or equipped with docking modules 126 capable of coupling with both mobile ground units 130 and aerial units 140. It is also possible that stationary ground units 120 might be configured to couple with either only mobile ground units 130 or only aerial units 140, or with only a certain type or design of one of the two classes of mobile robotic units.

Stationary ground unit 120 also includes a sensor suite 122, which in some embodiments can be identical or similar to the sensor suites 132, 142 present on the mobile ground units 130 and aerial units 140, respectively. It is also possible that sensor suite 122 comprises a different array of sensors in comparison to sensor suites 132, 142, be it a smaller or larger array of different sensors. In general, it is contemplated that stationary ground unit 120 can use its sensor suite 122 to monitor its immediately surrounding environment much in the same fashion as how the mobile ground units 130 and aerial units 140 use their sensor suites 132, 142 to monitor their surrounding environments/the intelligent perimeter 150. In some embodiments, stationary ground unit 120 can be configured to process the environment surrounding perimeter protected entity 110 and/or to process the area of intelligent perimeter 150 when no mobile robotic units (or a limited/insufficient number of mobile robotic units) are currently active.

Stationary ground unit 120 further houses a mesh radio 127, which can provide a communication modality different from that provided by the cellular core unit (i.e., LTE core 124) of stationary ground unit 120. In some embodiments, mesh radio 127 can be used to provide backhaul in support of mobile network 160. Mesh radio 127 can additionally be used to implement a MANET protocol (Mobile Ad-hoc Network), e.g., using a designated MANET radio or transceiver. Although shown as separate components, mesh radio 127 and LTE core unit 124 can be combined into a single unit/component of stationary ground unit 120. Stationary ground unit 120 can additionally include a VLC (Visible Light Communication/"LiFi") transceiver (also now shown) for direct communication with other stationary ground units 120 (and/or mobile ground units 130 and aerial units 140) that are similarly equipped with a compatible VLC transceiver. In some embodiments, a VLC transceiver, if present, can comprise the mesh radio 127, can be integrated with the mesh radio 127, and/or can be integrated with LTE core unit 124.

Although stationary ground unit 120 is, of course, stationary at some selected location within intelligent perimeter 150, it is not necessarily the case that stationary ground unit 120 is permanently stationary. In other words, stationary ground unit 120 can still be designed to be portable or otherwise repositionable, whether by its own means, transportation by one or more of the mobile robotic units, or transportation by human users 118 associated with perimeter protected entity 110. For example, stationary ground unit 120 can be provided with a form factor such that it can be transported by a backpack or other carrying device worn by one of the human users. More specifically, stationary ground unit 120 could be disassembled and packed for storage in and transportation by backpack, or stationary ground unit 120 might be enclosed within a backpack or carrying device on a more permanent basis. It is also contemplated that a mobile ground unit 130 could be converted into or temporarily designated as a stationary ground unit 120, whether by keeping a mobile ground unit 130 stationary at a fixed location or by adding additional modular parts to a mobile ground unit 130 in order to bring its capabilities in line with those of the stationary ground units 120 described herein.

As mentioned previously, stationary ground unit 120 can be equipped with a greater computational capacity than the mobile ground units 130 and/or aerial units 140, given that the stationary ground units are not constrained by the need to carry locomotion equipment and the requisite power supply to enable movement. Accordingly, stationary ground unit 120, in addition to providing the LTE core unit 124 that underlies mobile network 160, can act as a hub for receiving and/or processing sensor data ingested by or streamed from the mobile ground units 130 and aerial units 140. Stationary ground unit 120 can also include one or more storage devices for storing sensor data or providing other database functionalities to support the mobile robotic units, the intelligent perimeter 150, the mobile network 160, and/or the mobile robotic network 100*a* as a whole. In many cases, this sensor data comes from mobile ground units and aerial units located at or about the intelligent perimeter 150, in which case stationary ground unit 120's processing of the sensor data can be used to implement, enable and maintain the intelligent perimeter 150. In particular, this can entail stationary ground unit 120 processing sensor data from the mobile robotic units and performing threat analysis/detection and/or activating alarms to the central control unit 112/the users 118 within perimeter protected entity 110.

In response to a threat or abnormality detected or triggered at intelligent perimeter 150, stationary ground unit 120 can activate one or more mobile robotic units of the mobile robotic network 100*a* (i.e., one or more mobile ground units 130 and/or aerial units 140). The newly activated mobile robotic unit(s) can be ones that are stored at the stationary ground unit 120, e.g., stored in or at the docking module(s) 126, or can be mobile robotic units that are stored elsewhere, whether at other stationary ground units 120 or other locations within or external to intelligent perimeter 150.

Robotic Units Mobile Ground Units 130

As illustrated in FIG. 1A, mobile ground units 130 include a sensor suite 132, a cellular radio node 135 (shown here as LTE radio node 135), a mesh radio 137, power supply 138, and a locomotion module 136. Note that, as above, although the following discussion makes reference to LTE communications and LTE-specific components, this is for purposes of example and is not to be construed as limiting—other mobile communications protocols such as 2G, 3G, and 5G (and upcoming mobile communications protocols such as 6G and beyond) can be employed with the requisite hardware included on the mobile ground unit 130 (and other robotic units of mobile robotic network 100*a*), without departing from the scope of the present disclosure.

In some embodiments, the mobile ground units 130 can be the primary means by which mobile robotic network 100*a* ingests environmental/sensor data and ensures streamlined and enhanced operation of both intelligent perimeter 150 and mobile network 160 (i.e., due to their greater payload, battery capacity, processing capacity etc. in comparison to the more constrained aerial units 140, which have more specialized use cases that benefit from or require aerial operation/verticality). While stationary ground units 120 are able to implement and manage intelligent perimeter 150 and mobile network 160 on their own, it is the introduction of mobile robotic units such as the mobile ground units 130 that enables a far greater degree of flexibility, adaptability, and reliability in the implementation and management of intelligent perimeter 150 and mobile network 160—unlike stationary ground units 120, mobile ground units 130 can be deployed to travel through the environment to investigate a potential threat or abnormality on intelligent perimeter 150, to expand/change the shape of intelligent perimeter 150, to expand the coverage of mobile network 160 or eliminate a network dead-spot before or as it arises. By virtue of their mobility and ability to travel through the environment, mobile ground robots 130 permit dynamic adjustment and reconfiguration to both the intelligent perimeter 150 and mobile network 160 in order to ensure optimal coverage and deliver peak functionality, in a highly reliable manner, to the users 118 present within perimeter protected entity 110.

The mobile ground units 130 can be utilized to establish the boundaries of intelligent perimeter 150 on the ground (with aerial units 140 establishing vertical boundaries of the intelligent perimeter, if deployed). Via control unit 112, a user within perimeter protected entity 110 (e.g., one of the users 118) can set, establish or adjust one or more parameters of intelligent perimeter 150. For example, the user can control the mix of robotic units (across the full range of stationary ground units 120, mobile ground units 130, and aerial units 140) for deployment, program or select a desired perimeter (shape, speed of patrol, frequency/separation/distribution of robotic units on patrol, etc.), and/or program or select a desired formation for one or more groups of robots (e.g., patrol the defined perimeter in groups consisting of two mobile ground units 130 separated by 100 ft along the boundary of intelligent perimeter 150, with an aerial unit 140 disposed halfway between the mobile ground units and operating at a height of 200 ft). Perimeter formations and other such configurations and programming will be discussed in greater depth with respect to the specific examples of FIGS. 2 and 3. In some embodiments, a TAK plugin can be utilized at control unit 112 in order to enable the user to interface with or otherwise command, control, and program the intelligent perimeter 150, mobile network 160, or various ones of the units/robotic units of mobile robotic network 100*a*. The TAK plugin can additionally allow a user at control unit 112 to respond to emergency notifications and threat alerts, access a live view of messages and logs of mobile robotic units or mobile robotic units at the perimeter, and/or live stream individual sensors/sensor suites of one or more of the robotic units of mobile robotic network 100*a*. The user can additionally adjust an overall mission, goal, mission plan, etc.

The mobile ground unit 130 includes an LTE radio node 135, which can participate in the hierarchy of mobile network 160 at a level below that of the LTE core units 124 provided by the stationary ground units 120. In some embodiments, LTE radio node 135 can be configured to operate as an additional, portable LTE core similar or identical to the LTE core unit 124 of stationary ground unit 120.

The sensor suite 132 can include one or more (or all) of the sensors described above. Additionally, sensor suite 132 can include multiple ones or duplicate instances of certain sensors, either for redundancy/backup purposes or to make different types of measurements that are possible with a given sensor (e.g., multiple microphones or sound sensors could be tuned for different frequencies).

Locomotion module 136 provides mobile ground unit 130 with the ability to move through its environment or travel along or within intelligent perimeter 150. Locomotion module 136 can be modular or take different forms, depending on the desired locomotion dynamics for a particular mobile ground unit 130. For example, locomotion module 136 might provide a wheeled, tracked, or legged movement system (although other movement systems and modalities may be utilized without departing from the scope of the present disclosure). Included within locomotion module 136 (or working in cooperation with locomotion module 136) can be a navigational system, running onboard the mobile ground unit 130, that enables the mobile ground unit 130 to perform functions such as object detection and/or object avoidance, relational or inertial navigation (particularly when GPS or other position information is lost or unavailable), object classification and tracking (particularly with respect to threat detection and unidentified objects, abnormalities, intrusions or disturbances at intelligent perimeter 150), and SLAM (simultaneous localization and mapping), as has been described previously.

Power supply 138 can take the form of a battery, fuel system and generator, etc. It is contemplated that power supply 138 is replenishable and, in some embodiments, extensible, e.g., via the addition of additional power supply or storage units such as batteries or fuel tanks. Moreover, power supply 138 might comprise a primary power supply for mobile ground unit 130 and one or more secondary power supplies (such as spare batteries) that can be used as backup to the primary and/or transferred to other robotic units (i.e., other mobile ground units 130, or to stationary ground units 120 and/or aerial units 140). In some embodiments, power supply 138 can include connectors or an appropriate interface to permit an aerial unit 140 to land on or otherwise dock with a mobile ground unit 130 and recharge its own power supply 148. In this scenario, the sensor suite 142 and/or processing capabilities of the recharging aerial unit 140 can be combined with or used to extend those of the mobile ground unit 130. Mobile ground unit can also include a docking module (not shown) to better facilitate this coupling with an aerial unit 140, whether for purposes of transferring charge/power supply or for combing sensing and processing capabilities.

Via one or more onboard processors, mobile ground unit 130 can process ingested sensor data from its sensor suite 132 to perform threat detection and analysis, and, if necessary, raise alarms. These alarms might be transmitted to one or more stationary ground units 120, distributed to one or more of the constituent mobile ground units 130 and aerial units 140 of mobile robotic network 100*a*, transmitted to control unit 112, and/or transmitted to users 118 within perimeter protected entity 110 (e.g., via their user equipment connected to mobile network 160).

Mesh radio 137 can be similar or identical to the mesh radio 127 described previously with respect to stationary ground unit 120, e.g., implementing MANET, VLC, DDL, etc. for backhaul purposes and/or to provide additional communication modalities besides that of the primary mobile network 160 connected via LTE radio node 135.

Advantageously, mesh radio 137 provides an additional means by which a mobile ground unit 130 can connect back with the mobile LTE network 160, and thereby extend the coverage area provided to one or more users 118 within perimeter protected entity 110. For example, as a user 118 moves away from a current coverage area of mobile LTE network 160, instead of facing diminished or dropped service (e.g., due to increased distance from the nearest stationary ground unit 120/LTE core 124), one or more mobile ground units 130 can travel with the user 118 to extend the coverage area of mobile LTE network 160 via its LTE radio node 145 (i.e., a user's communication would be relayed from their user equipment to LTE radio node 135, and then onto the LTE core 124 at a stationary ground unit 120) or through its mesh radio 137 (e.g., a user's communication would be relayed from their user equipment to the LTE radio node 135 (or directly to mesh radio 137) of mobile ground unit 130, which would then relay the user's communication to the LTE core 124 at a stationary ground unit 120 via its mesh radio 137). Additional details and specific examples of communication paths and network coverage extension enabled by the mobile robotic units of the present disclosure will be discussed with respect to the scenarios illustrated in FIG. 1B.

Robotic Units Aerial Units 140

As illustrated in FIG. 1A, aerial units 140 include a sensor suite 142, a cellular radio node 145 (shown here as LTE radio node 145), a mesh radio 147, a power supply 148, and a propulsion module 146. Note that, as above, although the following discussion makes reference to LTE communications and LTE-specific components, this is for purposes of example and is not to be construed as limiting—other mobile communications protocols such as 2G, 3G, and 5G can be employed with the requisite hardware included on the aerial unit 140 (and other robotic units of mobile robotic network 100*a*), without departing from the scope of the present disclosure.

In some embodiments, many of the common components between aerial unit 140 and mobile ground unit 130 (and/or stationary ground unit 120) can be similar or identical. For example, sensor suite 142 might be similar or identical to one or both of the previously described sensor suites 132, 122. However, it is also possible that sensor suite 142 have one or more sensors/components unique to aerial unit 140, in order to better accommodate its unique functionalities and expected operation. For example, sensor suite 142 might include multiple cameras, higher resolution cameras, and/or telephoto cameras/lenses in order to maximize the higher vantage point offered by aerial unit 140 in comparison to either mobile ground units 130 or stationary ground units 120.

Other ones of the components present on aerial unit 140 can be provided in a smaller and/or more lightweight form factor in order to optimize for flight time, given the previously discussed limitations on the maximum deployment time of aerial unit 140 in comparison to the maximum deployment time of a mobile ground unit 130. For example, as also discussed previously, aerial unit 140 can have a lesser processing capacity and rely primarily on streaming its ingested sensor data or otherwise offloading heavy processing tasks to other units or components of mobile robotic network 100*a*, such as mobile ground units 130, stationary ground units 120, control unit 112, or some other central server(s) and/or computing device(s) provided in or associated with perimeter protected entity 110. Similarly, aerial units 140 might carry a reduced sensor suite 142 that is geared primarily to aerial surveillance and foregoes what can be considered more ancillary sensors when viewed from this aerial surveillance perspective (e.g., climate probes or sensors might be provided in the sensor suites of one or more mobile ground units 130 and/or stationary ground units 120, but can be omitted from the sensor suite 142 of aerial unit 140 given that climate measurements/data would not as directly contribute to the goal of performing aerial surveillance or furthering the situational awareness of mobile robotic network 100*a*).

In general, aerial units 140 can be utilized within mobile robotic network 100*a* to provide air support and more flexible, faster response times for emergencies or other time-sensitive matters (e.g., if a threat/potential threat is detected at intelligent perimeter 150, then an aerial unit 140 could be deployed to arrive on scene first and begin providing immediate surveillance and supplemental sensor data during the time window in which mobile ground units 130 are still traveling to the relevant location). In this manner, aerial units 140 can be used to supplement the baseline surveillance, sensor data ingestion, and intelligent perimeter/mobile network operation provided by the mobile ground units 130 and stationary ground units 120, as needed. For example, aerial units 140 can be deployed to act as network repeaters to provide a link across a distance or in an area that such a link would not be possible with the current deployment of mobile ground units 130 and stationary ground units 120 (a specific example of this aerial unit repeater functionality is discussed with respect to FIGS. 4 and 5, as are details of the use of aerial units 140 in providing continuity of signal).

Propulsion module 146 provides aerial unit 140 with the ability to fly or otherwise travel freely through its environment vertically and horizontally. For example, propulsion module might be used to provide horizontal thrust for a fixed wing aerial unit, or to provide propulsive power to a rotary wing aerial unit. In some embodiments, propulsion module 146 and/or aerial unit 140 can include a lighter than air lift device, combined with propulsive means for controlling horizontal and vertical movement of the aerial unit 140. In some embodiments, aerial unit 140 can be a drone or other unmanned aerial vehicle (UAV). When the plurality of aerial units 140 that are part of mobile robotic network 100*a* are a heterogeneous mix of different types/designs, different aerial units 140 can utilize different propulsion modules 146 in order to achieve different functionalities and assist in different mission goals. For example, an aerial unit 140 fitted with a lighter than air lift device could be utilized to provide aerial surveillance and/or network repeater functionalities for extended periods of time (and in some embodiments could be tethered to a power source, e.g., an external power source or mains electricity at perimeter protected entity 110, or the power supply of a stationary ground unit 120, etc.), while another aerial unit 140 could be provided as a high-performance, short duration drone to provide immediate responses and rapid deployments to distant areas when needed. The aerial units 140 can be modular to support adjustment of their performance characteristics and mission goals, e.g., such that one or more of the users 118 within perimeter protected entity 110 can add and remove modules as needed to configure an aerial unit 140 as desired.

Mobile Robotic Network Example Deployment and Usage Scenarios

The disclosure turns now to FIG. 1B, which is a diagram depicting an example deployment 100*b* of a mobile robotic network (such as mobile robotic network 100*a* described above with respect to FIG. 1A). In particular, FIG. 1B depicts an environment in which multiple "building block" groups (labeled 'Pod A'-'Pod H') of the three different primary unit types interact and communicate with one another over various communication modalities in order to provide the reliable and extended private mobile communication network (and intelligent perimeter) of the present disclosure. Recall that the three primary unit types discussed above are 1) Stationary ground units (labeled here as "GR"), 2) Mobile ground units (labeled here as "MR"), and 3) Aerial units (labeled here as "AR").

A pod consists of one or more of the three primary unit types. Although some pods can contain at least one of each unit type (see, e.g., Pods A-E, G and H) it is not necessary that a pod contain one of each unit type (see, e.g., Pod F). Moreover, a pod can be defined by only a single unit, although each illustrated pod in FIG. 1B contains three units. Additionally, pods can be nested within pods, forming a pod of pods. One such example is shown at 160*a*, which contains Pods A and B, in addition to a control unit 112 (and is hence labeled as 'Base Pod'). Although not shown, a perimeter protected entity could be located within the Base Pod 160*a*, i.e., in proximity to control unit 112. However, the perimeter protected entity could also be located elsewhere in the deployment environment 100*b*, whether in one of the remaining Pods C—H or outside of any of the labeled pods (whether wholly or partially).

Communication links exist between the various constituent units of the same pod (e.g., in Pod A, MR-GR, MR-AR, and AR-GR), as well as between different pods (e.g., Pod F-Pod G). Note that for simplicity of illustration, communication links are depicted generally as being between pods, rather than between specific units in the pods as occurs in reality—as there are a variety of different unit-to-unit connection pairs/combinations that can be used to establish a communication link between a first and second pod.

The communication links can be established over various different communication modalities provided by the mobile robotic network of the present disclosure. For example, both inter-pod and intra-pod communications can be performed over LTE links (or other primary cellular links from the private mobile network 160), MANET links, VLC links, or DDL links as discussed above—it is appreciated that additional communication methods and technologies can additionally be employed without departing from the scope of the present disclosure.

For example, a primary communication path can be established over LTE or other desired cellular communication protocol such as 5G (i.e., this can be the same as the private mobile network 160 of FIG. 1A). When available, intra-pod and inter-pod communication is performed over an LTE communication link or by otherwise making use of the private LTE network. For example, all of the constituent MR, GR, and AR units (along with the control unit 112) contained within Base Pod 160*a* can be connected via and communicate over primary LTE communication links. Any user equipment within range of the MR, GR, and AR units (which each have either an LTE core unit or an LTE radio node, as discussed above) is also able to connect to the private LTE network 160 and also communicate over primary LTE communication links, in a manner similar or identical to how they would connect to a public LTE network infrastructure.

In some embodiments, control unit 112 can include a satellite communications module or radio 113, which provides a connection to other networks such as the Internet via one or more telecommunications satellites. Accordingly, when a satellite communications module 113 is present, if a connection path can be established between a user equipment and the satellite communications module (e.g., through one or more intermediate GR, MR, or AR units and/or one or more pods), the user equipment can establish bi-directional communications with any external networks such as the Internet that are connected at or reachable from the other end of the satellite communications link.

When LTE communication links are unavailable or undesirable/unnecessary (e.g., because their higher bandwidth is not needed and not worth the additional power expenditure), one or more forms of additional communication links such as MANET, VLC, or DDL can be utilized. For example, this can be seen in FIG. 1B as the LTE communication link between Base Pod 160*a* and Pod C, indicated with a solid line to indicate its primary status, and the MANET and VLC communication links between Base Pod 160*a* and Pod C, indicated with dashed lines to indicate their backup or secondary status. In some embodiments, mobile robotic network 100*a* can be configured with a hierarchy of communication modalities, e.g., with LTE primary links, MANET secondary links, and VLC tertiary links—this can be seen via the MANET and VLC communication links between Pod C and Pod D, with the MANET link indicated with a solid line to indicate its higher relative preference in the communication hierarchy relative to the VLC link indicated with a dashed line indicating its lower relative preference in the communication hierarchy, all else equal. (Note also that the connection between Pod C and Pod D is available over either MANET or VLC but not LTE, e.g., because Pods C and D are out of LTE connection range.

It is noted that these other communication links or modalities are not only utilized as backups or failover options if an LTE connection fails, times out, or is too weak—in some embodiments, a given communication queued for transmission can be analyzed in light of factors such as bandwidth requirements, urgency, power requirements and power availability for transmitting and receiving, etc., and a most suitable link automatically selected in light of these factors. In some embodiments, a transmission can be generated along with an indication of a requested communication modality or specific communication link/path, or if no communication link is specified, intelligent routing and link selection can be automatically performed by mobile robotic network 100*a*.

MANET links or communication paths can be utilized to perform intra-pod and inter-pod communications in a manner similar or identical to the previously described LTE communication links. For example, in some embodiments, MANET can be used to provide an LTE or primary cellular communication network backhaul for pods that are otherwise not able to be connected by direct LTE/primary cellular communications. In the context of FIG. 1B, Pod C and Pod E are shown as being connected via MANET, which might occur because the separation between Pods C and E exceeds the range of the LTE network or because an obstacle or other impediment exists along the attempted LTE connection path. In this manner, Pod E (and its GR, MR, and AR, along with any connected user equipment) is still able to reach the primary LTE network via its MANET link to Pod C.

More particularly, consider the scenario depicted in FIG. 1B, in which the MR, GR, and AR units within Base Pod 160*a* and Pod C remain in direct connection with the private LTE network 160 (which is created or provided by the LTE cores and/or LTE radio nodes carried on the ground units 120 and/or mobile ground units 130 and aerial units 140). However, Pods D and E are not connected to any LTE communication paths and therefore are not connected to the private LTE network 160. As mentioned previously, this can occur for a variety of different reasons, including but not limited to, an insufficient or unavailable LTE signal at the locations of Pods D and E (e.g., the respective GR, MR, and AR units are in a "dead zone" of the private LTE network or are otherwise determined to have an insufficient signal strength (e.g., RSSI) to reliably connect to the private LTE network), or a need to go silent over the LTE bands currently being used. In some embodiments, a switch to MANET by one or more of the Pods D and E (or their constituent robotic units) can be made automatically in response to a determination that the increased bandwidth offered by connecting to the private LTE network is unnecessary for the current needs of the robotic units and/or connected user equipment (i.e., the current communication needs of human users 118), and that power can therefore be conserved by switching to MANET instead. In operation, the MANET network is formed between at least the MR, GR, and AR robotic units within Pods D and E that are not directly or currently connected to private LTE network 160, and one or more of the remaining MR, GR, and AR robotic units within Pod C (or elsewhere within the various pods of the constituent robotic units of mobile robotic network 100*a*). In some embodiments, the MANET network can comprise all of the MR, GR, and AR robotic units in mobile robotic network 100*a*, so in the context of FIG. 1B, all of the MR, GR, and AR robotic units that are shown. In operation, multicast routing can be performed over the devices participating in the MANET network in order to transmit data packets/communication signals between the robotic units at one end/pod and the robotic units at the other end/pod. For example, a data packet can be transmitted from GR 120*e* to GR 120*d* (of Pods E and D, respectively) over the MANET network, and subsequently relayed from GR 120*d* to one of the robotic units within Pod C (e.g., GR 120*c*). At this point, data packets from the otherwise isolated Pods D and E can reach the remaining devices and units within the private network, either over further MANET links to the final network destination or via other links available from Pod C and beyond (e.g., LTE paths are available from Pod C to Base Pod 160*a*, so a MANET transmission from Pod D could be decoded and transformed at Pod C for transmission over its LTE path to Base Pod 160*a*). In the case in which MANET is used for the full length of the transmission, in the context of this example Pod C could simply use one of its MANET paths to Base Pod 160*a* in order to relay the data packet from Pod D, without the computational overhead of converting between transmission formats/protocols. In this fashion, the mobile ad-hoc network maintains communications between the otherwise isolated Pods D and E on one end, and the remaining Pods and mobile robotic units of the mobile robotic network 100*a* on the other end(s).

In some embodiments, the determination of whether to use MANET, LTE, VLC, DDL, or any other available communication modalities and paths for any intermediate and/or final hops to the desired destination device can be made based on an analysis of the packet(s) or signal transmission(s). For example, a large or high priority transmission might be switched over to LTE as soon as an LTE communication link becomes available, to take advantage of the increased bandwidth available over LTE in comparison to MANET. However, a small or low priority transmission might remain on the MANET network for the entirety of its path—thereby reducing power consumption and the computational overhead required to perform network switching at the intermediate Pods or robotic units that would be required to receive a transmission over MANET and then retransmit it over the private LTE network. Although not shown, in some embodiments a satellite, VLC, or other type of backhaul could be used to reduce the number of intermediate hops required to connect an outside user, pod, or robotic unit to the private LTE network. In such a scenario, the robotic unit (i.e., a GR, MR, or AR that is suitably configured) would communicate directly with an appropriate or available communication satellite, which would then forward the communications to a satellite transceiver within the private LTE network, e.g., satellite communications unit 113 (within control unit 112 of Base Pod 160*a*). As will be discussed in greater depth below, a robotic unit that is outside of the private LTE network (e.g., such as the MR, GR, and ARs within Pods D and E) can first attempt to connect to the MANET network or otherwise establish a MANET network. If a MANET connection is unavailable, then VLC or DDL can be used to attempt to establish a point-to-point communication, either directly with a robotic unit that is the intended final destination of the data packet or with any robotic unit that is reachable over VLC (in which case the transmission could be accompanied with an intended destination or a routing request for the data packet to be forwarded to a certain final destination).

For example, GR 120*e* (within Pod E) is outside of the private LTE network and otherwise only able to communicate with Pod D and within its own Pod E. This could arise in a scenario in which GR 120*e*, the remaining robotic units of Pod E, and any human users or perimeter protected entity associated with Pod E were previously in communication with or a part of Pod C, e.g., Pod E splintered off from Pod C and was deployed to expand the intelligent perimeter to its current location. For a period of time, Pod E would have remained in LTE communication with Pod C, and therefore connected to the private LTE network. However, as Pod E continues to travel away from Pod C, it eventually loses signal and is unable to connect to an LTE path or directly to the private LTE network. At this point, the robotic units within Pod E "know" that the robotic units within Pod C should be an intended destination for data packets/communications, as they were until LTE communications were lost, or can otherwise infer that the robotic units within Pod C are likely to be the closest units able to connect back to the private LTE network and should attempt to be raised over alternate communication modalities.

GR 120*e*, or any other ones of the robotic units within Pod E, might first attempt to reach Pod C over MANET. In scanning the MANET network or attempting to establish a MANET connection, GR 120*e* determines that no direct MANET links are available that would connect it to a Pod C robotic unit. GR 120*e* might attempt to establish/find a multi-hop MANET link that will eventually connect it to a Pod C robotic unit (e.g., the multi-hop MANET link from Pod C-Pod D-Pod E that was discussed above), but such a process can be time-consuming, introduce latency from the search process and/or intermediate hops, etc., and is not guaranteed to succeed.

Accordingly, GR 120*e* can attempt to establish a VLC link with one of the Pod C robotic units, as such a link will provide a low latency, direct connection to the desired communication destination. Visible Light Communication (VLC) can be used to transmit wireless communications at very high speeds, generally based on one or more point-to-point connections between VLC transceivers (in this context, provided on one or more of the stationary ground units 120, mobile ground units 130, and/or aerial units 140 of the mobile robotic network 100*a*). Various types of visible light sources can be used for transmitting data, including but not limited to solid-state devices such as light emitting diodes (LEDs), super-luminescent laser diodes and other laser diodes. Using these light sources, the VLC transceivers modulate information signals on top of the visible light output. Modulation techniques including but not limited to OOK (On-Off Keying), OFDM (Orthogonal Frequency Division Multiplexing), RP-OFDM (Reverse Polarity Orthogonal Frequency Division Multiplexing) and/or PSK (Phase Shift Keying) can be used to transmit data. A receiver can receive this information and demodulate to provide interpretation of the transmitted information. VLC transmission speeds can exceed 100 Gbps, making them an attractive solution for use within mobile robotic network 100*a*, whether for point-to-point, multi-hop or any other transmissions. While VLC provides a physical medium for communication, it is appreciated that various high layers of communication (e.g., in the TCP/IP protocol) can be applied to the presently disclosed VLC transceivers and communications. Additionally, in some embodiments it is contemplated that one or more VLC transceivers can provide a physical medium for MANET (the mobile ad-hoc network between multiple or all of the robotic units). The use of VLC MANET can offer higher bandwidth and/or range in certain scenarios, and accordingly might be used in lieu of a dedicated MANET. However, by virtue of employing visible light, VLC communications in some scenarios are less stealthy or covert than MANET radio transmissions. Accordingly, the presently disclosed mobile robotic network and/or its constituent robotic units might dynamically switch between VLC and dedicated radio transmissions for implementing the MANET network, based on factors such as network/communication path performance capabilities, desired performance, current environmental and network conditions, mission needs and parameters, etc.

Because VLC is a line-of-sight (LOS) communication method, in some embodiments an aerial unit such as AR 140*e* can be deployed to fly upwards, increase LOS range and maximize the chances of successfully establishing a VLC connection. Correspondingly, in some embodiments, Pod C (or any pod having just lost communication with another pod/robotic unit(s)) can respond to the communication loss by deploying one or more aerial units such as AR 140*c* on its own end, to further increase the likelihood of successfully establishing the VLC connection. Advantageously, because the mobile robotic network 100*a* and its constituent robotic units work in a collaborative fashion, the current/last known location information for each Pod and robotic unit can be widely disseminated or otherwise made available to all of the robotic units across the network. Using this last known location information, AR 140*e* within the disconnected Pod E can deploy, fly upwards, and orient its VLC transmitter in the direction corresponding to the last known location of Pod C. Similarly, Pod C can deploy its AR 140*c* (or any other robotic unit attempting to establish a VLC connection with the disconnected Pod E) to orient its own VLC transmitter in the direction corresponding to the last known location of Pod E.

In this scenario, if a VLC connection is successfully established between AR 140*e* and AR 140*c*, then Pod E can now be communicatively coupled back into the private network via the various communication paths emanating from Pod C. Moreover, by communicating with Pod C over a direct (and often, high bandwidth) VLC link, Pod E foregoes the delay introduced by searching for, establishing, and subsequently communicating over a multi-hop MANET path, which would otherwise be its only fallback option in the case of LTE communication loss. This increased bandwidth and connection speed offered by VLC can be of critical importance, particularly in emergency situations (which often times involve a Pod or group of users that are separated or physically isolated from the network/remaining pods and users). In this manner, the multiple communication modalities integrated into the constituent MR, GR, and AR robotic units of the presently disclosed mobile robotic network(s) can be leveraged to provide seamless, extended communications coverage.

Additionally, the establishment of a direct VLC connection between Pod E and Pod C (e.g., between ARs 140*e* and 140*c*) can permit the two pods and their constituent robotic units to coordinate a plan or strategy of network and/or hardware adjustments that will bring Pod E back into connection with the broader mobile robotic network 100*a* in a more stable and reliable long-term fashion. This might involve changing the mission parameters of Pod E (e.g., travel back into LTE range of Pod C), changing the mission parameters of Pod C (e.g., move closer to Pod E while still maintain an LTE connection to Base Pod 160*a* or some other pod/robotic unit participating in the private LTE network), or deploying one or more particular robotic units with a specific goal to extend the private LTE network coverage to the location of Pod E. For example, the VLC connection between ARs 140*e* and 140*c* is of a necessarily limited duration, i.e., only as long as the ARs have sufficient battery power to remain aloft and also power their VLC transceivers. Using this brief VLC window, Pods C and/or E can negotiate to deploy one or more of their ground robots (GRs 120*c,e*) to a location or locations between Pods C and E, where the ground robot could temporarily (or more permanently) function as a stationary ground robot and provide LTE signal repeater functionality to bring Pod E back into the private LTE network. (Note that LTE repeater functionality and examples will be discussed in greater depth with respect to the examples of FIG. 4).

A similar dynamic is illustrated by Pods F and G, where the two aerial units 140*f*-1, 140*f*-2 of Pod F are deployed as aerial repeaters to bridge LTE communications from Base Pod 160*a* to the robotic units of Pod G (which otherwise would be beyond communication range to Base Pod 160*a* directly). With the LTE communication paths established to Pod G, the robotic units of Pod G can then bring the robotic units of Pod H back into connection with the private LTE network.

If an LTE connection is able to be established between Pod G and Pod H, then the LTE network can be further extended to include Pod H, its MR, GR, and AR, and any connected user equipment. However, if a communication link (LTE, MANET, VLC or otherwise) is for some reason unable to be established between Pod G and Pod H, then Pod H can nevertheless maintain network connectivity via a VLC link between one of its constituent units (such as AR 140*h*) and a constituent unit within Base Pod 160*a* (e.g., GR 120*a* of Pod A). Although a slight delay might be introduced due to the need to convert between or interconnect VLC communications and LTE communications, the constituent units and connected user equipment associated with Pod H can nevertheless experience a connection that is substantially similar to what would be experienced over a 'pure' LTE connection path. That is, all intra-pod communications within Pod H can continue to be performed over LTE, and then converted into VLC (at the MR, GR, or AR of Pod H) for inter-pod transmission to one of the constituent units of Pod A—upon arriving at the constituent unit of Pod A, the VLC transmission can be decoded and retransmitted/reintroduced into the LTE communication network via the LTE node of the same constituent unit in Pod A that received the VLC transmission from Pod H. Additionally, given that Pod H is shown as already relying on VLC to reach back to Base Pod 160*a*, in some embodiments these VLC links can continue to be used even after Pod G bridges one or more LTE communication paths to Pod H, e.g., because the VLC communication paths might remain more attractive (due to factors such as bandwidth, latency, etc.) for those specific communications that would be between Pod H robotic units and Base Pod 160*a* units anyways, even if transmitted over LTE paths/the private LTE network.

Figure 2A:
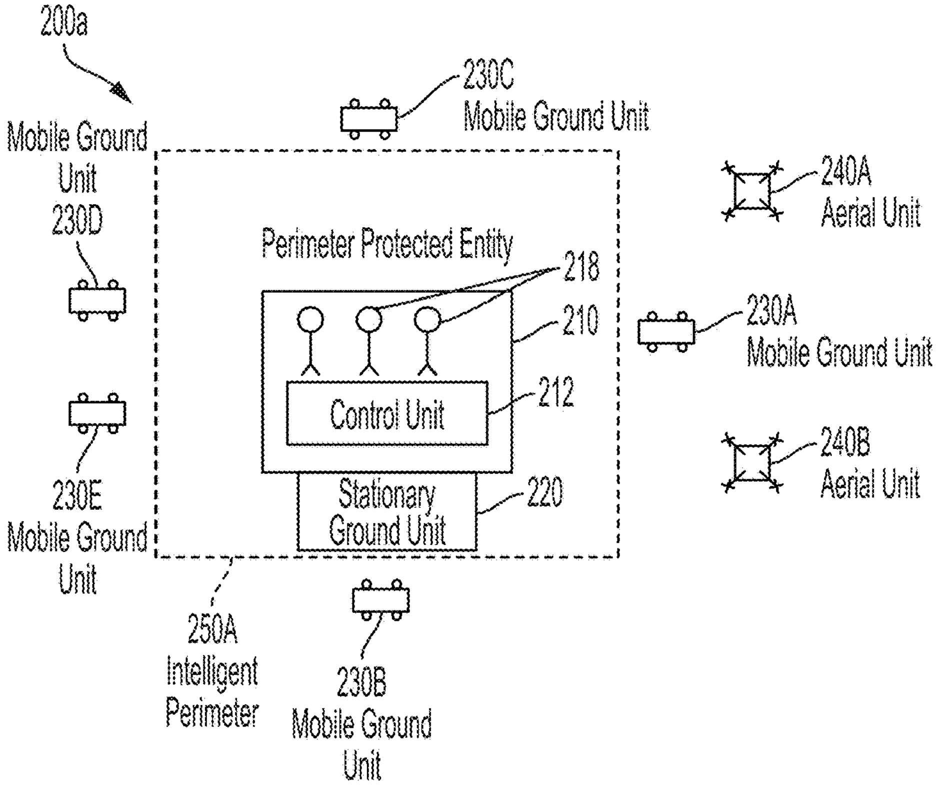
FIGS. 2A-B depict a dynamic reconfiguration and adjustment of a multi-domain autonomous robotic perimeter and integrated mobile communication network according to aspects of the present disclosure.
Figure 2B:
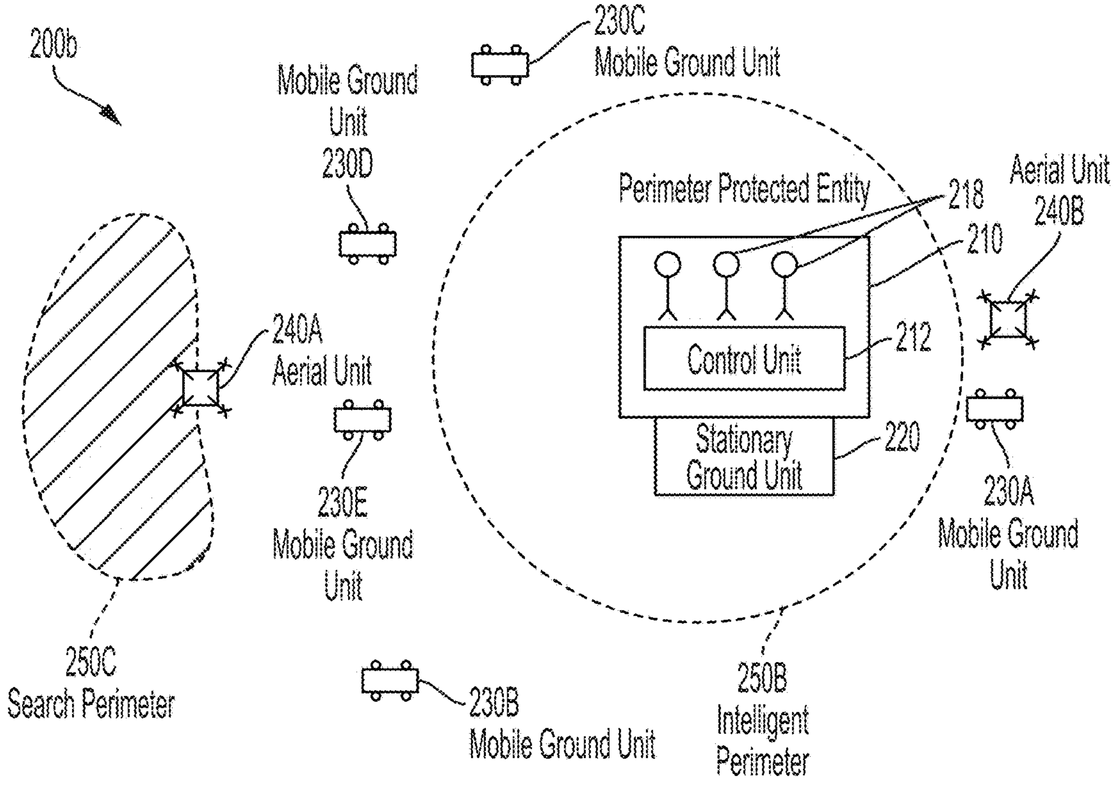

The disclosure turns now to FIGS. 2A-B, which depict an example of a dynamic reconfiguration and adjustment of a mobile robotic network 200 according to aspects of the present disclosure. In some embodiments, mobile robotic network 200 can be similar or identical to mobile robotic network 100*a* and/or include some or all aspects of one or more of the mobile robotic networks disclosed herein, in implementing a multi-domain autonomous robotic perimeter and integrated private mobile communication network. In particular, FIG. 2A depicts the mobile robotic network in a first state 200*a*, where a 'standard' patrol is being executed at intelligent perimeter 250A; FIG. 2B depicts the same mobile robotic network in a second state 200*b*, where an 'alarm' or 'threat' response patrol is being executed at a reconfigured intelligent perimeter 250B.

In the first state 200*a* of FIG. 2A, in which the mobile robotic network executes a normal patrol about intelligent perimeter 250A, the mobile robotic network is centered around a primary base location of perimeter protected entity 210, as evidenced by the presence of stationary ground unit 220—recalling that stationary ground units 220 are deployed in order to establish and support an intelligent perimeter and private mobile network around an area that will be secured and used as a base of operations by perimeter protected entity 210 and its constituent human users 218. Accordingly, commensurate with this primary base location status, the intelligent perimeter 250A is shown configured in a rectangular shape surrounding perimeter protected entity 210A, with a plurality of different robotic units patrolling on or about the intelligent perimeter. These robotic units are shown as mobile ground units 230A-E and aerial units 240A-B, although it is appreciated that this is chosen for purposes of example, and that a different mix, greater/lesser number of units, etc., can all be utilized without departing from the scope of the present disclosure.

Using control unit 212, one or more of the users 218 within perimeter protected entity 210 can configure parameters of intelligent perimeter 250A. For example, as discussed previously, these parameters can include a perimeter shape, size, orientation, patrol pattern, composition of robotic units, location of robotic units, patrol frequency, patrol parameters, etc. Patrol patterns or formations of the deployed robotic units on intelligent perimeter 250A can be selected from pre-determined options or can be selected as a dynamically adjusting formation. Examples of dynamically adjusting formations include a 'follow the leader' option, in which one or more robotic units (e.g., mobile ground units or aerial units) are configured to a follow a selected leader, which can be a specific one of the robotic units, a human 218, or some combination of the two. In a follow the leader formation, a perimeter shape and/or objective can be configured for both the leader and the follower robotic units. For example, one perimeter configuration might require that the intelligent perimeter 250A be maintained at a distance of at least 100 feet from the perimeter protected entity 210 or the human users 218.

In addition to maintaining a visual/monitored perimeter (i.e., intelligent perimeter 250A), the robotic units also maintain and provide a private mobile telecommunications network (i.e., a private LTE network). In some embodiments, maintaining full and complete coverage of the private LTE network can be implemented in base-level programming or as a primary objective of one or more of the robotic units, such that patrol and formation adjustments made with respect to the robotic units and the intelligent perimeter will not be permitted to degrade the LTE network beyond some threshold level. In some embodiments, such adjustments will only be permitted if a corresponding adjustment or additional robotic unit deployment is performed in order to compensate, either wholly or partially, for the LTE network degradation that would otherwise be caused by the formation/patrol adjustment to the currently deployed robotic units. In some embodiments, the mobile robotic network can perform a continuous, dynamic monitoring and optimization of all mission parameters (with respect to both intelligent perimeter 250A and the private LTE network/other communication networks and modalities) such that adjustments, commands, reconfigurations, etc., to the robotic units are made in a manner that achieves or maintains all mission goals and parameters, or otherwise, in a scenario in which all mission goals and parameters cannot be met, optimizes the manner in which mission goals are either adhered to or disregarded.

With respect to robotic unit formations, e.g., such as the formations of the mobile ground units 230A-E and aerial units 240A,B seen in FIG. 2A, static and mobile formations can also be employed—in the context of intelligent perimeter 250A, a static formation would entail selected ones of the mobile ground units 230A-E and aerial units 240A-B being assigned to remain in a fixed location while still in a deployed state—e.g., although neither of the mobile robotic types would be actively moving (notwithstanding the movement involved in an aerial unit maintaining a hover), their sensor suites could remain active to ingest data along intelligent perimeter 250A to detect or assist in detecting threats and other abnormalities. In a mobile formation, selected ones of the mobile ground units 230A-E and aerial units 240A-B would patrol (e.g., move) along intelligent perimeter 250A or some other commanded/determined path while still ingesting sensor data. For example, each robotic unit might patrol the entire length of intelligent perimeter 250A, either clockwise or counterclockwise, while maintaining a fixed separation from immediately adjacent robotic units. A mobile formation maintaining fixed separation would therefore maintain a fixed deployment pattern of the robotic units. In some embodiments, the separation between adjacent robotic units can be adjusted dynamically, resulting in a constantly evolving deployment pattern of the robotic units as they move along their patrols of intelligent perimeter 250A. Rather than navigating the entire length of intelligent perimeter 250A, a robotic unit in a patrol formation might only be responsible for patrolling a certain sector or portion of territory assigned to it (e.g., mobile ground unit 230A+aerial units 240A,B could patrol the right side of intelligent perimeter 250A, mobile ground unit 230B could patrol the bottom, mobile ground unit 230C could patrol the top, and mobile ground units 230D,E could patrol the left side of the intelligent perimeter). The above are provided for explanation and illustration only and are not intended to be construed as limiting—various other patrol patterns, formations and dynamics may be utilized without departing from the scope of the present disclosure. The robotic units themselves (and/or control unit 212, or mobile robotic network 200) can also make autonomous adjustments to the deployment patterns, formations, and patrol characteristics of the mobile robotic units, thereby responding to detected changes or abnormalities in the environment, the intelligent perimeter, and/or the private mobile communication network.

For example, in some embodiments one or more machine learning networks can be trained to perform threat detection using as input the ingested sensor data collected from the robotic units along and within the intelligent perimeter. The trained machine learning networks (and/or models) can be provided at a centralized location, such as control unit 212, stationary ground unit(s) 220, or some other server/computing device of perimeter protected entity 212. In some embodiments, a trained machine learning network can be provided to run onboard one or more of the mobile ground units 230 and/or aerial units 240, such that the trained machine learning network receives ingested sensor data from the sensor suite of a given robotic unit and then analyzes the ingested sensor data in real-time to perform functions such as, but not limited to, object classification and identification; map building and learning; threat detection, identification, and/or classification; and anomaly detection. In some embodiments, one or more pre-trained machine learning networks can be utilized. One or more machine learning networks can also be trained in a beginning-to-end fashion for use in mobile robotic network 200. In some embodiments, pre-trained machine learning networks may also be re-trained or otherwise adjusted/customized to the mobile robotic network and/or its particular deployment, environment, mission, perimeter protected entity, etc. The retraining process can utilize the same training data used in the primary training process (i.e., the mobile robotic network can use the same or similar training data to both re-train any pre-trained machine learning networks and freshly train any un-trained machine learning networks). In some embodiments, one or more of the machine learning networks can include, but are not limited to, artificial neural networks (ANNs), convolution neural networks (CNNs), recurrent neural networks (RNNs), etc.

Training data can be generated automatically via control unit 212. For example, when a threat or potential threat is detected at intelligent perimeter 250A, one or more of the robotic units (i.e., 230A-E, 240A-B) raises an alarm to control unit 212. This alarm can be configured to include either the relevant sensor data in which the threat was detected, a pointer or identifier allowing the relevant sensor data to be retrieved/accessed, etc. The control unit 212 displays the automatically generated threat alert to a user 218 and can additionally display some or all of the relevant sensor data (from either a single robotic unit, multiple robotic units, or a meshed sensor output generated from multiple robotic units) for the user 218 to review as well. Based on the threat alert and their review of the underlying sensor data, the user 218 can provide an input to control unit 212, where the input either acknowledges/confirms the threat (at which point intelligent perimeter 250A/mobile robotic network 200 respond to the threat in a fully autonomous fashion, or receive further inputs from user 218 via control unit 212 specifying threat response commands) or dismisses the threat. When dismissing a threat, control unit 212 can prompt user 218 for further input that specifies a correct classification or categorization of the object/event that triggered the potential threat alarm. In other words, when a threat alarm is dismissed, this means that the robotic units (and/or the threat detection system/machine learning network(s)) detected some object or event from their ingested sensor data, but then incorrectly classified that object or event as a threat the user is therefore prompted to provide the correct classification for the detected object/event.

For example, the robotic units might detect (in their ingested sensor data) an aerial object approaching intelligent perimeter 250A. In this scenario, the aerial object is actually a large bird that happens to be flying towards the intelligent perimeter and should not be classified as a threat or cause an alarm to be raised. However, the threat detection system running on robotic units (or otherwise processing their ingested sensor data might raise an erroneous alarm/threat detection for several different reasons. For example, the threat detection system may be unable to classify the aerial object with sufficient confidence (e.g., 75% confidence it is a bird, but 50% confidence it is a UAV); the threat detection system may be unable to classify the aerial object at all (e.g., object detected but no further classification possible); or the threat detection system might classify the aerial object incorrectly (e.g., 99% confidence it is a UAV, only 20% confidence it is a bird).

Accordingly, human inputs to control unit 212 specifying the correct classification for objects/events that trigger false alarms from the threat detection system can be used to generate labeled training data pairs, each pair consisting of an input example (the ingested sensor data from which the false alarm was raised) and a desired output (the correct classification specified by the human user of control unit 212). By configuring control unit 212 to display relevant ingested sensor data for each threat alarm that is raised, the labeled training data can be automatically and seamlessly generated during normal operation of mobile robotic network 200—the input example of a training data pair can be exactly the same as the relevant ingested sensor data displayed by control unit 212 to the human user.

In addition to detecting threats and raising alarms to human users 218 and/or perimeter protected entity 210, it is also contemplated that mobile robotic network 200 can autonomously and automatically adjust itself to take both defensive and offensive stances in response to a threat, alarm, or abnormality. For example, recall that FIG. 2A depicts the mobile robotic network in a first state 200*a*, wherein both the network and the perimeter protected entity 210 are in a stationary state, e.g., positioned at a fixed base of operations (a fixed base of operations could be a military installation, an emergency operations command tent, a temporary camp made by humans 218, etc.)

FIG. 2B depicts a second state 200*b*, in which the mobile robotic network has reconfigured itself into a second state 200*b* in order to perform an 'alarm' or 'threat' response type patrol or deployment. Consider a scenario in which a possible threat or abnormality is detected behind (i.e., to the left of perimeter protected entity 210 and intelligent perimeter 250A).

For a confirmed threat, a threat response might entail investigating the immediate vicinity in which the confirmed threat was detected. For example, if a single unidentified human is detected and classified as a threat, it can be prudent to deploy mobile robotic units/expand the intelligent perimeter to include the area where the unidentified human was detected—he may be part of a larger group that has managed to remain undetected.

For a potential threat, a threat response might still entail investigating an area in which the potential threat was detected. For example, a single human might be only momentarily detected before he disappears behind cover. It can be useful to deploy mobile robotic units/expand the intelligent perimeter to include the area where the momentary detection occurred—it needs to be determined whether the detection was spurious or not, whether the human is a friendly or a threat, whether the human might have additional companions with him, etc.

With this and various other potential scenarios in mind where it can be helpful to perform an area search in response to a threat or abnormality detected by the robotic units/intelligent perimeter, the discussion turns to FIG. 2B, which illustrates a general alarm response configuration in which the robotic units 230A-E, 240A-B are redeployed and reconfigured into a primary intelligent perimeter 250B and a search perimeter 250C.

As shown, the primary intelligent perimeter 250B remains generally centered about perimeter protected entity 210 and users 218, although here its shape has changed—contracting towards the right-hand side (the direction in which there is not a current threat/alarm event) and expanding towards the left-hand side (the direction in which there is a current threat/alarm event). The primary intelligent perimeter 250B includes all of the robotic units but for aerial unit 240A, which has been redeployed as the sole member of search perimeter 250C. It is appreciated that various other configurations and combinations of the various robotic units into the primary intelligent perimeter 250B and the search perimeter 250C can be utilized without departing from the scope of the present disclosure.

Compared to the standard patrol intelligent perimeter configuration seen in FIG. 2A, the contraction and expansion into primary intelligent perimeter 250B and search perimeter 250C frees up more of the mobile robotic resources (both mobile ground units and aerial units) to travel farther away from perimeter protected entity 210 in order to investigate the threat or potential threat. For example, aerial units 240A and 240B were previously deployed as a pair on the right-hand side of intelligent perimeter 250A, as the farthest out robotic units. With the loss of aerial unit 240A to search perimeter 250C, aerial unit 240B retreats and is newly paired with mobile ground unit 230A to collectively monitor and patrol the right-hand side of primary intelligent perimeter 250B. If a stationary ground unit (such as stationary ground unit 220 seen in FIG. 2A) remains within range or is otherwise carried with (e.g., in a backpack configuration) or deployed by perimeter protected entity 210 at its new location in FIG. 2B, then such a stationary ground unit can additionally monitor and/or assist in monitoring and patrol functionalities along the right-hand side of primary intelligent perimeter 250B, or along the entirety of primary intelligent perimeter 250B.

Because mobile ground unit 230A and aerial unit 240B have moved within closer proximity to perimeter protected entity 210, this allows mobile ground units 230B-E to travel farther away from perimeter protected entity 210 and towards the area of the detected threat/search perimeter 250C. In order to maintain telecommunications coverage at a requisite level, some or all of the robotic units can increase a transmission power or otherwise increase a transmission range of their LTE radio nodes (and/or any other communication transceivers) in a collaborative fashion. Note that none of the mobile ground units 230B-E are shown as joining search perimeter 250C, instead remaining just beyond—in some embodiments, one or more of the mobile ground units could join search perimeter 250C in order to support or otherwise augment the search efforts being carried out by aerial unit 240A. For example, the farthest mobile ground units 230D-E could be deployed into search perimeter 250C, while mobile ground units 230B-C can retreat back towards perimeter protected entity 210 as needed to maintain adequate network coverage for the private LTE network.

Figure 3:
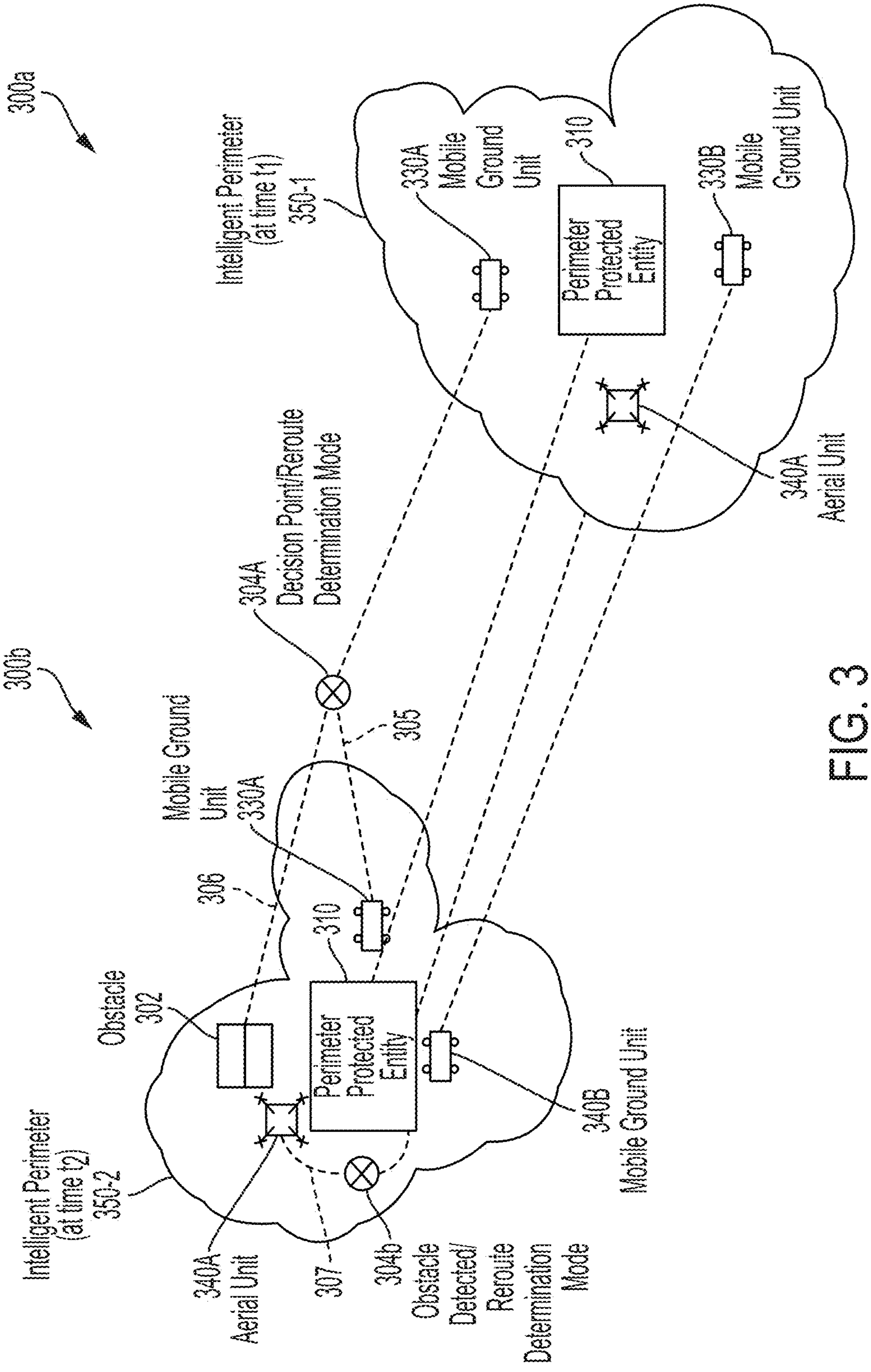
FIG. 3 depicts an obstacle avoidance and dynamic reconfiguration of a multi-domain autonomous robotic perimeter and integrated mobile communication network according to aspects of the present disclosure.

FIG. 3 depicts an example deployment scenario 300 of a mobile robotic network in which the intelligent perimeter dynamically and autonomously reconfigures itself in reaction to an obstacle detection performed by one or more of its constituent robotic units. Beginning at the bottom right-hand corner, the mobile robotic network is shown in a first state/position at a time $t_1$ (the upper left-hand corner shows the mobile robotic network in a second state/position at time $t_2$). At time $t_1$, the mobile robotic network and its associated perimeter protected entity 310 are proceeding through the environment and have not yet detected any obstacles, and as such remain in a default or previously selected perimeter formation/configuration, i.e., here with an aerial unit 340A leading the way and two mobile ground units 330A,B flanked on either side of perimeter protected entity 310. A bubble around perimeter protected entity 310 and the three constituent robotic units indicates an approximate extent (for illustration purposes, not drawn to scale) of the private LTE network and intelligent perimeter provided to perimeter protected entity 310 by the mobile robotic units.

As the mobile robotic network and perimeter protected entity 310 move through the environment (i.e., move from the bottom right to the top left), an obstacle 302 is detected by one or more of the mobile robotic units. For example, the obstacle 302 might be detected from the ingested sensor data collected by aerial unit 340A, which might be outfitted with more sensitive optics and/or greater telephoto/magnification capabilities than either of the two mobile ground units 330A,B. The obstacle detection can be performed wholly onboard aerial unit 340A, distributed amongst aerial unit 340A and mobile ground units 330A,B, streamed back to a control unit/central computing device or some other external computing device reachable through the private LTE network, or some combination of the above.

With the obstacle detected, trajectory calculations can be performed to determine whether or not it will be necessary for the mobile robotic network to reconfigure itself or route one or more of the constituent mobile robotic units 340A, 330A,B around the obstacle. In some embodiments the obstacle might be detected in advance and then simply monitored until the mobile robotic network is close enough that a decision point (i.e., reroute or remain on course) is reached. FIG. 3 depicts this as decision point 304*a* at which a reroute determination is affirmatively made. Based on the projected trajectories of the mobile robotic units, it is determined that mobile ground unit 330A will collide with obstacle 302 unless a reroute is initiated and the mobile robotic network reconfigured. As illustrated, at decision point 304*a*, mobile ground unit 330A is rerouted to follow a new path 305 (rather than its old path 306, which would have led to a collision with obstacle 302).

Note that this reroute decision is made in order to not only achieve the goal of obstacle avoidance, but also to maintain the continuity of the intelligent perimeter and the signal strength of the private LTE network (both of which might have minimum threshold or other required performance characteristics specified by a mission plan or parameters assigned to the mobile robotic network). As such, while mobile ground unit 330A could maneuver around obstacle 302 by going farther away from perimeter protected entity 310 (i.e., up towards the top of the figure), this might lead to a degradation in or loss of coverage from the private LTE network to perimeter protected entity 310. Accordingly, mobile ground unit 330A is routed to avoid obstacle 302 by taking path 305 and moving closer to perimeter protected entity 310.

In some embodiments, the mobile robotic network can further make dynamic and autonomous adjustments to other ones of its constituent mobile robotic units, even though those units themselves were not performing any obstacle avoidance. For example, in addition to decision point 304*a* at which mobile ground unit 330A makes a reroute determination, also shown is a second decision point 304*b*, at which aerial unit 340A is rerouted off of its current trajectory and onto a modified path 307, bringing aerial unit 340A closer to perimeter protected entity 310 and extending coverage of the private LTE network into an area that was previously handled by mobile ground unit 330A before it was required to move away in the course of performing obstacle avoidance. In this manner, the continuity of coverage from the private LTE network implemented by the mobile robotic network is automatically maintained as perimeter protected entity 310 moves through the environment and past various obstacles, terrain impediments, etc.

Figure 4:
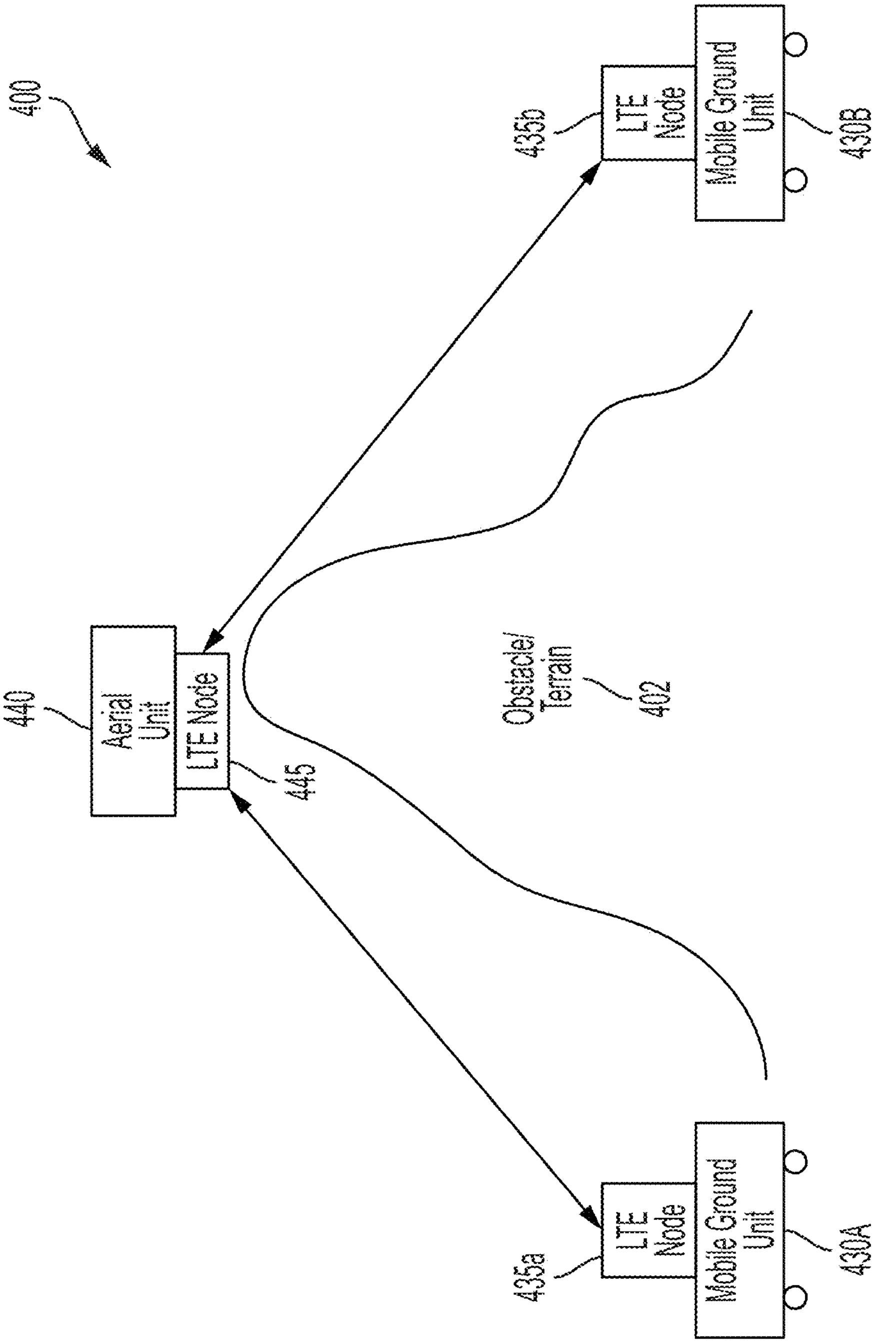
FIG. 4 depicts a collaborative interaction between ground and air robotic units of a multi-domain autonomous robotic perimeter and integrated mobile communication network in order to maintain mobile network connectivity and perimeter coverage according to aspects of the present disclosure.

FIG. 4 illustrates a deployment scenario 400 in which an aerial unit 440 is utilized as an aerial repeater to bridge LTE connectivity between two mobile ground units 430A,B that are otherwise separated by an obstacle 402. Obstacle 402 might be a literal environmental obstacle such as a mountain, or could be a conceptual obstacle such as distance, weather, etc. Moreover, although only mobile ground units 430A,B are shown as being separated by obstacle 402 and bridged together via the LTE repeater functionality provided by aerial unit 440, it is equally possible that one or more aerial units 440 be utilized to bridge communications (LTE or otherwise) between two or more pods or disparate mobile robotic networks that are separated by an obstacle 402 (e.g., similar to the scenarios described with respect to FIG. 1B).

Communications that need to be transmitted from mobile ground unit 430B to mobile ground unit 430A would normally take place directly, e.g., via their respective LTE nodes 430*b,a*. However, with obstacle 402 precenting this normal operation, aerial unit 440 can be deployed to fly up and over the obstacle to provide a bridge or repeater that connects LTE node 435*b* to LTE node 435*a*. By flying high enough or to an appropriate location, aerial unit 440 could also provide bridging or repeater functionality via the VLC transceivers of the robotic units (recalling that VLC transmissions require line of sight). Aerial unit 440 could also provide MANET bridging or repeating in a fashion similar or identical to LTE. Additional aerial units can also be utilized to form a repeater bridge as long as necessary (or as long as possible based on the available aerial units for deployment for such a purpose). In some embodiments, one or both of the mobile ground units 430A,B could have an aerial unit stored onboard, e.g., via a docking module as discussed with respect to FIG. 1A. Upon losing communications or otherwise detecting/encountering obstacle 402, one or both of the mobile ground units 430A,B could respond by deploying their onboard aerial unit to form an LTE or communications bridge, over which the mobile ground units could negotiate a plan to maintain communications or resolve the issue posed by obstacle 402 in order to maintain communications once the aerial unit(s) 440 deplete their charge and are forced to land.

Figure 5:
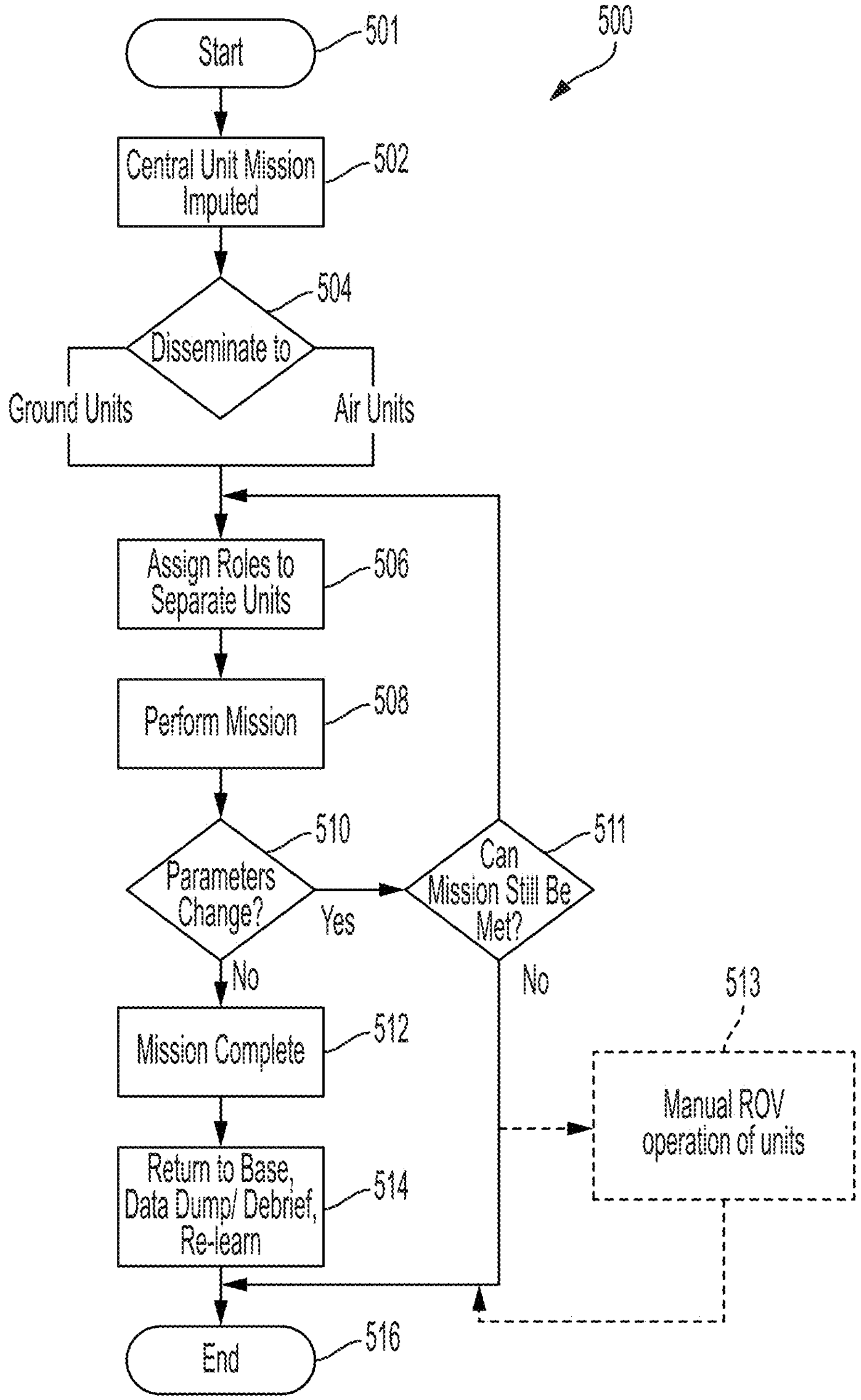
FIG. 5 is a flowchart illustrating an example deployment process of a multi-domain autonomous robotic perimeter and integrated mobile communication network according to aspects of the present disclosure.

FIG. 5 is a flowchart depicting an overall process flow 500 by which the presently disclosed mobile robotic network(s) can be deployed and operated. At a start point 501, an overall mission or goal (or parameters and configurations thereof) is inputted to the mobile robotic network. For example, in the context of FIGS. 1A-B, this overall mission input could be provided by one of the users 118 via control unit 112, although other input dynamics are also possible.

The overall mission input is then disseminated or otherwise distributed to the constituent units of the mobile robotic network (e.g., stationary ground units, mobile ground units, and aerial units) at 504. This distribution can take place over the private LTE network, MANET, VLC, DDL, or any combination of the above (and/or any combination of other communication modalities equipped within the constituent units of the mobile robotic network). In some embodiments, information can be transferred to one or more of the constituent units of the mobile robotic network via hardwired connections, e.g., in the scenario in which one or more of the constituent units are in a stowed or non-deployed state and are therefore able to receive a hardwired connection. For example, hardwired information transfer could occur during a planning or mission configuration stage at or within the intelligent perimeter/perimeter protected entity.

At 506, roles are assigned to the separate units of the mobile robotic network. In some embodiments, the mission input distribution can be performed automatically based on the mission input being made from a plurality of pre-defined options. In some embodiments, the mission input can be parsed by the mobile robotic network in order to generate commands and configurations/parameters at various levels of the hierarchy of the mobile robotic network. For example, an overall mission input can be parsed into mission inputs for the stationary ground units, mission inputs for the mobile ground units, and mission inputs for the aerial ground units. These type-based mission inputs can then be further parsed into individual configurations for the robotic units of that type, either as a distributed compute task or as a compute task assigned to specific robotic units. In some embodiments, overall mission inputs can be parsed into mission input commands/configurations for each individual robotic unit all at once by a central processing or computing unit, e.g., at the perimeter protected entity or by the control unit itself.

At 508, the mission is performed (e.g., such as described with respect to any of the example scenarios and deployments discussed above with respect to FIGS. 1A-4).

A determination is made at 510 as to whether mission parameters have changed—either by virtue of an input from one of the human users within perimeter protected entity (via the control unit), an automatic determination by the mobile robotic network, or some combination of the two.

If it is determined ‘Yes’ that mission parameters have changed at 510, then a further determination is made at 511 as to whether or not the mission can still be met with the current deployment and/or configuration of the constituent units of the mobile robotic network.

If the answer at 511 is ‘Yes’ the mission can still be met by the current selection of units even with the updated parameters from 510, then the method returns to step 506 at which roles are assigned to constituent units of the mobile robotic network—the updated mission parameters are parsed or otherwise distributed in a same or similar manner as described above with respect to the initial input of mission parameters beginning at 502.

If the answer at 511 is ‘No’ the mission cannot still be met by the current selection of units given the updated parameters from 510, then the mission is terminated at 512 and the robotic units are commanded to return to base (i.e., perimeter protected entity, or some other deployment/docking/storage site associated with each robotic unit). Upon returning to base, or in response to a return to base command, one or more of the robotic units can perform a data dump of their ingested sensor data, and perform a mission debrief and/or re-learning process (e.g., in the scenario in which machine learning networks are used to perform threat detection or otherwise analyze ingested sensor data from the mobile robotic units, then their ingested sensor data is used to generate additional labeled training data and the machine learning networks are re-trained on this new labeled training data such that the re-trained machine learning networks are configured for use or deployment into onboard memory of the mobile robotic units before their next deployment or mission).

In some embodiments, an optional step 513 can be performed in response to a determination at 511 that ‘No’ the mission cannot still be met by the current selection of units given the updated parameters from 510. In this optional step 513, rather than terminating the mission, one or more (or all) of the constituent units can be configured for a manual ROV (remotely operated vehicle) operation in order to still perform part or all of the updated mission. For example, one or more humans from the perimeter protected entity can assume ROV control of a single robotic unit, or multiple robotic unit, and transmit real-time commands to cause the ROV-controlled robotic units to execute the updated mission. This ROV control can utilize one or more streams of sensor data from the robotic units back to a control device of the ROV operator (i.e., human within the perimeter protected entity, although it is also possible that the ROV operator is remote from/not a part of the perimeter protected entity). For example, these streams of sensor data for ROV operation could include, but are not limited to, audiovisual data such as still images and video, audio, thermal imaging, etc., as captured by one or more sensors or payload components of each individual robotic unit. In some embodiments, one or more of the robotic units can be configured to operate in an autonomous or semi-autonomous mode that assists in the ROV operation of a different robotic unit. For example, a human user within the perimeter protected entity, using for example the control unit or a mobile computing device, can assume ROV operation of a first robotic unit, which is designated as a leader of one or more 'follower' robotic units operating in an autonomous or semi-autonomous fashion. The follower robotic units could be configured to collect additional sensor data, such as different camera angles and perspectives, that can augment the human user's ability to perform ROV operation of the first robotic unit. In some embodiments, the follower robotic units could execute a pre-defined formation with respect to the first 'leader' robotic unit that is under human ROV control.

Figure 6:
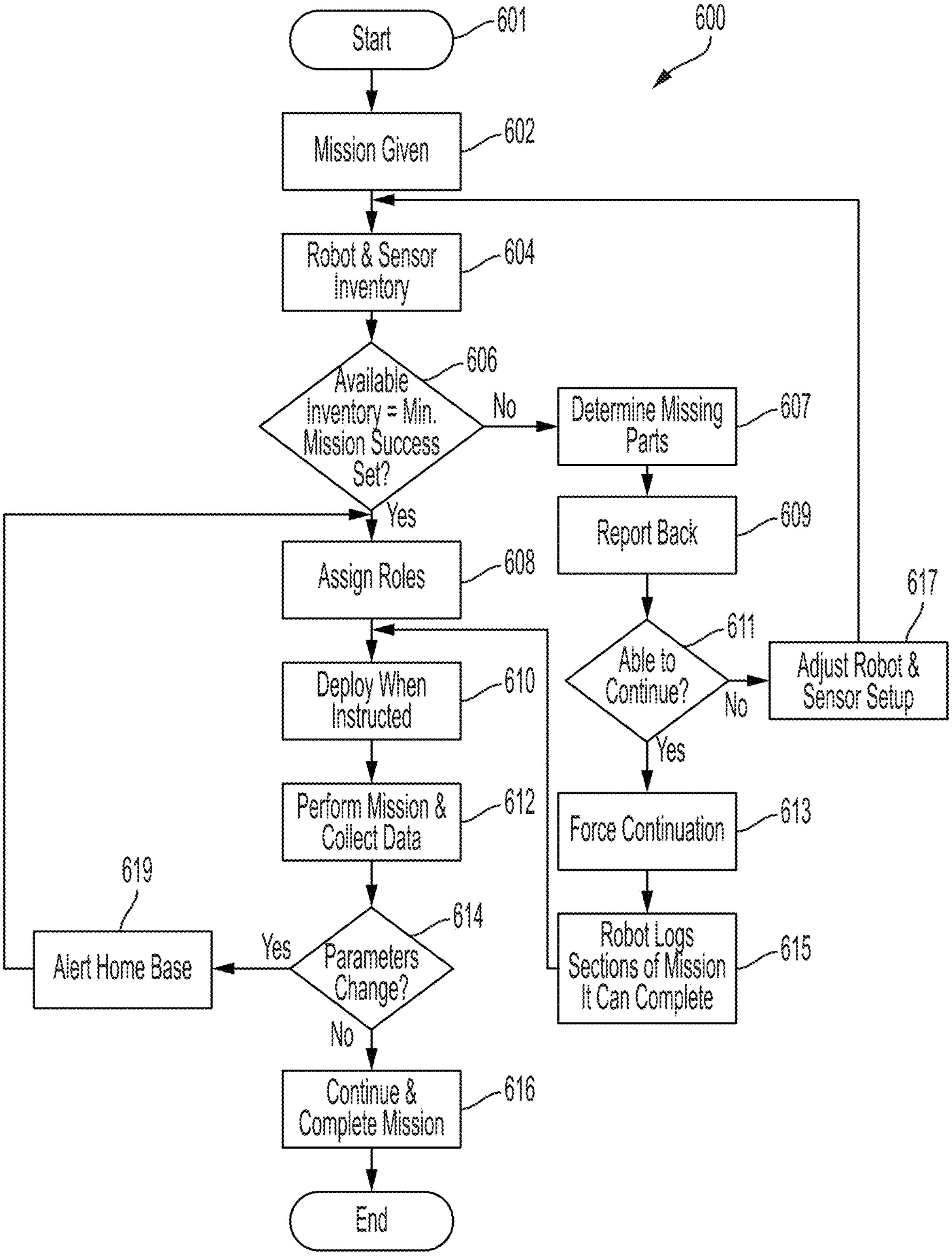
FIG. 6 is a flowchart illustrating an example deployment process of air and ground robotic units of a multi-domain autonomous robotic perimeter and integrated mobile communication network according to aspects of the present disclosure.

FIG. 6 is a flowchart 600 illustrating a more specific mission flow or deployment for mobile ground units and aerial units. At 601, the method begins and a mission is assigned at 602. The mission assignment can be the same or similar as the mission assignment described above with respect to steps 502, 504 of FIG. 5. In some embodiments, mission assignment 602 can come from a control unit or human user within the perimeter protected entity, or can be distributed to the mobile ground units and/or aerial units from the central control unit or other central computing device responsible for parsing an overall mission into more specific components for the constituent units of the mobile robotic network.

An inventory is conducted of the available robotic units and sensors at 604. This inventory can determine current availability across the entire mobile robotic network, current availability of just non-deployed units, current availability of non-deployed units+deployed units with a lower priority mission that could be repurposed/redeployed for this mission, etc.

Based on the inventory of 604, a determination is made at 606 as to whether the available inventory comprises a minimum mission success set (or whether it is possible to supplement the available inventory appropriately if it is inadequate/does not comprise the full minimum mission success set).

If the available inventory is determined to be sufficient at 606, the roles are assigned to the constituent aerial units and mobile ground units at 608. This role assignment process can be the same or similar to the role assignment 506 in FIG. 5. If the available inventory is determined to be insufficient at 606, then the method proceeds instead to 607 (which will be discussed in greater depth below).

Continuing down the path in which the inventory determination was successful, from role assignment 508 the aerial and ground robotic units wait and deploy when instructed at 510. The deployment instruction can come from a human user within the perimeter protected entity, from the control unit, or from the mobile robotic network itself (or some other constituent robotic unit that is already deployed).

At 612, the newly deployed aerial and mobile ground units perform their mission and collect data as described above and throughout the present disclosure. If mission parameters do not change (i.e., step 614 results in 'No'), then the mission continues and terminates at 616. If mission parameters do in fact change (i.e., step 614 results in 'Yes'), then the home base is alerted at 619. In this context, the home base can comprise the perimeter protected entity, the human users within the perimeter protected entity, a stationary ground unit, a central computing device associated with or disposed within the perimeter protected entity, etc. After alerting the home base at 619, the method returns to step 608 at which point roles are assigned (i.e. re-assigned) and the mission then performed based on the new roles and updated parameters from 614.

Returning now to step 606, at which an inventory assessment is performed, the method proceeds to step 607 if the inventory assessment fails—i.e., the minimum mission success set of robotic units and/or sensors is not available and/or cannot be assembled in the requisite amount of time.

The specific missing parts that caused the inventory assessment to fail are determined at 607, and then reported back at step 609. This report back might be transmitted to the users within the perimeter protected entity, to the control unit within the perimeter protected entity, and/or to a central computing device associated with or disposed within the perimeter protected entity.

After reporting back, a determination is then made at 611 as to whether the mission is able to continue even in light of the missing parts determined in 609. For example, some missions might include in the minimum success set four aerial robots for redundancy purposes when only two aerial robots are actually needed—in this case, the mission would still be able to continue even though there were missing parts determined in 609. In other scenarios, the mission would not be able to continue in light of the missing parts determined in 609—e.g., if the mission requires two aerial robots and zero are available.

If the mission is unable to continue, then step 611 proceeds to step 617, where the setup or composition of robotic units and/or sensors is adjusted in light of the missing parts from 609. In some embodiments, this might entail pulling the necessary robotic unit(s) off of another mission and reassigning them to the current mission, e.g., where it is determined that the additional robotic unit is not needed in the other mission or that the current mission has a higher priority than the other mission. Alternatively, the composition adjustment of step 617 could also entail waiting for the requisite robotic unit/sensor resources to become available as other missions conclude or new robotic units are added to the mobile robotic network. In some embodiments, a priority-based queuing and requesting system could be utilized to determine how to best reassign robotic unit/sensor resources coming off of a deployment to certain ones of queued, pending missions awaiting that specific resource.

If the mission is however, determined to be able to continue at step 611, then a continuation is forced at step 613 (effectively overriding the limitations imposed by the minimum mission success set that caused the failure at the inventory check of step 606). The entire mission can then be performed, if able with the reduced inventory set. Alternatively, it might be determined that some of the distinct components of the mission can be performed with the reduced inventory set, but some components cannot—at step 615, those components that can be performed will be initiated and logged as normal, with the process returning to step 610 and proceeding from there as described previously. In some embodiments, the mission components that could not be performed are logged at step 615 and queued as a new mission that will be performed once the necessary robotic units and/or sensors become available.

What is claimed is:

1. A system comprising:

at least one stationary ground unit associated with providing a mobile perimeter for a perimeter protected entity, each stationary ground unit including at least one primary transceiver for creating a first private network different from a public network, and at least one secondary transceivers for providing at least a second network different from the private network;

a plurality of mobile robotic units communicatively coupled, via at least one of the private network and the second network, to the at least one stationary ground unit, the mobile perimeter provided using the at least one stationary ground unit deployed within the mobile perimeter and the communicatively coupled plurality of mobile robotic units deployed along a boundary of the mobile perimeter, each mobile robotic unit comprising:

a network node for extending the private network, wherein the private network is extended based on direct connections among the at least one primary transceiver and the respective network nodes of each mobile robotic unit of the plurality of mobile robotic units;

one or more secondary mobile transceivers for communicating with the stationary ground unit via at least the second network;

a plurality of sensors configured to continuously ingest a plurality of perimeter data streams from a surrounding environment of the mobile robotic unit;

a locomotion device for maneuvering and propelling the mobile robotic unit within the surrounding environment; and a controller, wherein the plurality of controllers of the plurality of mobile robotic units are communicatively linked such that the mobile robotic units create the mobile perimeter around the perimeter protected entity and a movable extension of the private network, wherein the controllers generate locomotion control signals to cause at least a portion of the plurality of mobile robotic units to reposition themselves within the surrounding environment and provide continuous coverage from the private network to the perimeter protected entity as one or more locations of the perimeter protected entity change; and a threat detection system configured to receive as input at least a portion of the plurality of perimeter data streams from one or more of the mobile robotic units and analyze the inputted perimeter data streams to identify and classify threats present at the mobile perimeter, the threat detection system comprising an abnormality detection performed onboard the plurality of mobile robotic units and a secondary abnormality classification configured to receive abnormality detections generated onboard one or more of the plurality of mobile robotic units, wherein the abnormality classification generates threat alarms based at least in part on an analysis of the received abnormality detections.

2. The system of claim 1, wherein the mobile perimeter:

encloses the perimeter protected entity;

comprises one or more of the plurality of mobile robotic units deployed to execute a specified patrol formation along the boundary of the mobile perimeter; and is monitored based one or more of ingested sensor data or ingested environmental monitoring data obtained from respective mobile robotic units of the plurality of mobile robotic units deployed along the boundary of the mobile perimeter.

3. The system of claim 1, wherein the abnormality classification is performed by one or more of:

one or more of the stationary ground units;

a central computing device disposed within the perimeter protected entity;

a control unit of the perimeter protected entity; or a cloud computing device communicatively coupled with the perimeter protected entity.

4. The system of claim 1, wherein the threat detection system comprises one or more trained threat detection machine learning networks, wherein the one or more trained threat detection machine learning networks are trained on a plurality of labeled training data pairs, each labeled training data pair comprising:

an input data example, the input data example generated from a portion of perimeter data streams ingested by the deployed mobile robotic units at the perimeter; and a classification label, wherein the classification label indicates one or more ground truth classifications corresponding to objects, abnormalities, and events contained within the input portion of perimeter data streams.

5. The system of claim 4, wherein a given training data classification labels is automatically generated from user input provided by a user within the perimeter protected entity by:

displaying, to the user, a given portion of the perimeter data streams that were ingested by the deployed mobile robotic units at the perimeter;

receiving, from the user, one or more user inputs indicative of objects, abnormalities, events, or threats present within the given portion of the perimeter data streams displayed to the user; and generating one or more ground truth classifications from the user input indicative of the objects, abnormalities, events, or threats.

6. The system of claim 5, wherein the displaying and receiving are performed by a user interface of a control unit computing device of the perimeter protected entity.

7. The system of claim 1, wherein the plurality of mobile robotic units includes one or more aerial units, drones, or unmanned aerial vehicles (UAVs).

8. The system of claim 1, wherein the plurality of mobile robotic units includes one or more mobile ground units, the locomotion devices of the mobile ground units including wheels, tracks, and legs.

9. The system of claim 1, wherein the plurality of sensors of the mobile robotic units include one or more of: LIDAR, radar, depth or stereo cameras and sensors, electro-optical sensors, infrared sensors, GPS sensors, location or position sensors, inertial measurement units (IMUs), seismic sensors, microphones, and sound sensors.

10. The system of claim 1, wherein the private network implements at least a 3G telecommunication standard.

11. The system of claim 1, wherein the private network implements at least a 4G telecommunication standard.

12. The system of claim 2, wherein the private network implements at least a 5G telecommunication standard.

13. The system of claim 1, wherein the private network implements at least an LTE telecommunication standard.

14. The system of claim 1, wherein the at least one second network uses a different communication modality than the private network, the second network communication modalities including one or more of:

MANET (Mobile Ad-hoc Network);

VLC (Visible Light Communication);

DDL (Direct Data Link); and satellite communications.

15. The system of claim 14, wherein the at least one stationary ground unit and the plurality of mobile robotic units each further comprise a MANET radio, wherein the MANET radio implements one or more of:

a backhaul for the private network; and
the second network.

16. The system of claim 14, wherein the second network comprises MANET and VLC is a physical communication medium for the second network.

17. The system of claim 1, wherein one or more of the stationary ground units and one or more of the plurality of mobile robotic units further comprises a mesh radio, wherein the mesh radio is configured to communicatively couple with one or more of the private network and the second network.

18. The system of claim 1, wherein one or more of the stationary ground units comprises a transportable housing such that the stationary ground unit can be transported with the perimeter protected entity via the transportable housing.

19. The system of claim 18, wherein the transportable housing comprises a backpack.

* * * * *